(12) United States Patent
Wang et al.

(10) Patent No.: US 10,129,801 B2
(45) Date of Patent: Nov. 13, 2018

(54) METHOD FOR CONTROLLING HANDOVER OF USER EQUIPMENT, BASE STATION, USER EQUIPMENT AND SYSTEM

(71) Applicant: Huawei Technologies Co., Ltd., Shenzhen, Guangdong (CN)

(72) Inventors: Yan Wang, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 14/979,385

(22) Filed: Dec. 27, 2015

(65) Prior Publication Data

US 2016/0127961 A1 May 5, 2016

Related U.S. Application Data

(63) Continuation of application No. PCT/CN2013/078114, filed on Jun. 27, 2013.

(51) Int. Cl.
*H04B 7/00* (2006.01)
*H04W 36/04* (2009.01)
(Continued)

(52) U.S. Cl.
CPC ............ *H04W 36/04* (2013.01); *H04L 45/16* (2013.01); *H04W 36/0016* (2013.01);
(Continued)

(58) Field of Classification Search
CPC ......... H04W 36/0016; H04W 36/0027; H04W 36/0061; H04W 36/0072
(Continued)

(56) References Cited

U.S. PATENT DOCUMENTS 8,437,753 B2 * 5/2013 Kim ................. H04W 24/10
370/254
9,277,584 B2 * 3/2016 Centonza ............ H04W 84/045
(Continued)

FOREIGN PATENT DOCUMENTS

CN 101651977 A 2/2010
CN 101959175 A 1/2011
(Continued)

OTHER PUBLICATIONS

Choi, English translation of provisional U.S. Appl. No. 61/804,227, provided on Sep. 7, 2015, 27 pages.*
(Continued)

*Primary Examiner* — Dmitry Levitan

(57) ABSTRACT

The present embodiment of the invention discloses a method for controlling handover of user equipment, including: acquiring indication information used for controlling handover of user equipment, where the indication information is used for indicating a cell or base station that can provide a multi-connectivity service to the user equipment; determining, according to the indication information, from the cell or base station that can provide a multi-connectivity service to the user equipment, a target cell or a target base station for handover; and sending a handover request to a base station of the target cell or the target base station. By means of the technical solutions of the present embodiment of the invention, user equipment can be accurately handed over to a base station that provides a multi-connectivity service to the user equipment.

5 Claims, 13 Drawing Sheets

(51) Int. Cl.
*H04W 76/15* (2018.01)
*H04W 36/00* (2009.01)
*H04L 12/761* (2013.01)
*H04W 36/32* (2009.01)

(52) U.S. Cl.
CPC ....... *H04W 36/0061* (2013.01); *H04W 36/32* (2013.01); *H04W 76/15* (2018.02)

(58) Field of Classification Search
USPC ................................. 370/310, 328, 331, 465
See application file for complete search history.

(56) References Cited

U.S. PATENT DOCUMENTS

| | | | | |
|---|---|---|---|---|
| 9,380,499 | B2* | 6/2016 | Kang | H04W 36/0033 |
| 2009/0291686 | A1* | 11/2009 | Alpert | H04W 36/0083 |
| | | | | 455/436 |
| 2011/0111749 | A1 | 5/2011 | Kim et al. | |
| 2011/0249651 | A1 | 10/2011 | Kang et al. | |
| 2012/0309395 | A1 | 12/2012 | Centonza et al. | |
| 2014/0204931 | A1 | 7/2014 | Jain | |
| 2016/0044548 | A1* | 2/2016 | Choi | H04W 36/04 |
| | | | | 370/331 |
| 2016/0286449 | A1* | 9/2016 | Choi | H04W 36/28 |
| 2016/0360460 | A1 | 12/2016 | Guo et al. | |

FOREIGN PATENT DOCUMENTS

| | | |
|---|---|---|
| CN | 102215539 A | 10/2011 |
| CN | 102457924 A | 5/2012 |
| CN | 103119989 A | 5/2013 |
| EP | 2 448 350 A1 | 5/2012 |
| EP | 2 618 609 A1 | 7/2013 |
| WO | WO 2012/051903 A1 | 4/2012 |

OTHER PUBLICATIONS

"CS capability of network for CS fallback", Huawei, 3GPP TSG RAN WG3 #61bis, Sep. 30-Oct. 3, 2008, 6 pages, R3-082677.
"Fundamental considerations on dual connectivity", NEC, 3GPP TSG RAN2 Meeting #81, Jan. 28-Feb. 1, 2013, 5 pages, R2-130267.
"Deployment scenarios and design goals for dual connectivity", NTT DoCoMo, Inc., 3GPP TSG-RAN WG2 #81, Jan. 28-Feb. 1, 2013, 6 pages, R2-130444.

* cited by examiner

METHOD FOR CONTROLLING HANDOVER OF USER EQUIPMENT, BASE STATION, USER EQUIPMENT AND SYSTEM

CROSS-REFERENCE TO RELATED APPLICATIONS

This application is a continuation of International Application No. PCT/CN2013/078114, filed on Jun. 27, 2013, which is hereby incorporated by reference in its entirety.

TECHNICAL FIELD

The present embodiment of the invention relates to the field of communications technologies, and specifically, to a method for controlling handover of user equipment, a base station, user equipment, and a system.

BACKGROUND

With the ongoing development of cellular technologies, a manner that a macro base station and a micro base station together form a network becomes increasingly popular. In this way, a system capacity can be increased, and a higher service rate and a larger service bandwidth can be provided to a user. A coverage area of the macro base station may be referred to as a macro cell, and a coverage area of the micro base station may be referred to as a micro cell.

However, because the coverage area of the micro cell is small, frequent handover occurs during movement of user equipment (UE), which affects system performance and user experience. Therefore, in an area covered by both the macro cell and the micro cell, the macro cell and the micro cell may be enabled to provide a service to the user equipment together, that is, the user equipment keeps dual connectivity to the micro base station and the macro base station, so that when some user data is transmitted in the micro cell, a connection between the user equipment and the macro base station is kept, thereby avoiding frequent handover.

During research and practice of the prior art, it is found that when multiple base stations can provide a dual-connectivity service to user equipment, a base station, among the base stations, does not know another base station that can also provide a dual-connectivity service to the user equipment, resulting in that during control of handover of a user equipment, the user equipment cannot be accurately handed over to a base station that can provide a dual-connectivity service.

SUMMARY

Embodiments of the present embodiment of the invention provide a method for controlling handover of user equipment, so that user equipment can be accurately handed over to a base station that provides a multi-connectivity service to the user equipment. The embodiments of the present embodiment of the invention further provide a corresponding base station, corresponding user equipment, and a corresponding system.

A first aspect of the present embodiment of the invention provides a method for controlling handover of user equipment, including:

acquiring indication information used for controlling handover of user equipment, where the indication information is used for indicating a cell or base station that can provide a multi-connectivity service to the user equipment;

determining, according to the indication information, from the cell or base station that can provide a multi-connectivity service to the user equipment, a target cell or a target base station for handover; and sending a handover request to a base station of the target cell or the target base station, so that the base station of the target cell or the target base station provides a connectivity service to the user equipment.

With reference to the first aspect, in a first possible implementation manner, the acquiring indication information used for controlling handover of user equipment includes:

acquiring adjacent cell information of a serving cell of a base station of a cell providing a multi-connectivity service or adjacent cell information of a serving cell of a base station providing a multi-connectivity service, where the adjacent cell information includes the indication information; and reading the indication information from the adjacent cell information.

With reference to the first aspect, in a second possible implementation manner, the acquiring indication information used for controlling handover of user equipment includes:

receiving the indication information configured by an operations, administration, and maintenance entity OAM.

With reference to the first aspect, in a third possible implementation manner, the acquiring indication information used for controlling handover of user equipment includes:

receiving the indication information reported by the user equipment.

With reference to the first aspect, or any one of the first to third possible implementation manners of the first aspect, in a fourth possible implementation manner, when the indication information is an inter-cell multi-connectivity indication identifier, the determining, according to the indication information, from the cell or base station that can provide a multi-connectivity service to the user equipment, a target cell or a target base station for handover includes:

determining, according to the inter-cell multi-connectivity indication identifier, from the cell that can provide a multi-connectivity service to the user equipment, the target cell for handover; and correspondingly, the sending a handover request to a base station of the target cell or the target base station, so that the base station of the target cell or the target base station provides a multi-connectivity service to the user equipment includes:

sending the handover request to the base station of the target cell, so that the base station of the target cell provides a multi-connectivity service to the user equipment.

With reference to the first aspect, or any one of the first to third possible implementation manners of the first aspect, in a fifth possible implementation manner, when the indication information is an inter-base station multi-connectivity indication identifier, the determining, according to the indication information, from the cell or base station that can provide a multi-connectivity service to the user equipment, a target cell or a target base station for handover includes:

determining, according to the inter-base station multi-connectivity indication identifier, from the base station that can provide a multi-connectivity service to the user equipment, the target base station for handover; and correspondingly, the sending a handover request to a base station of the target cell or the target base station, so that the base station of the target cell or the target base station provides a connectivity service to the user equipment includes:

sending the handover request to the target base station, so that the target base station provides a connectivity service to the user equipment.

With reference to the first aspect, or any one of the first to third possible implementation manners of the first aspect, in a sixth possible implementation manner, when the indication information is multiple cell identifiers ECGIs (the abbreviation/acronym "ECGI" means "E-UTRAN Cell Global Identifier"), the determining, according to the indication information, from the cell or base station that can provide a multi-connectivity service to the user equipment, a target cell or a target base station for handover includes:

searching the multiple ECGIs for at least one ECGI whose base station identifier field is different from a base station identifier field of a serving base station; and determining the target base station from a base station corresponding to the at least one ECGI; and correspondingly, the sending a handover request to a base station of the target cell or the target base station, so that the base station of the target cell or the target base station provides a connectivity service to the user equipment includes:

sending the handover request to the target base station, where the handover request carries an ECGI whose base station identifier field is the target base station, so that the target base station provides a connectivity service to the user equipment.

A second aspect of the present embodiment of the invention provides a method for controlling handover of user equipment, including:

receiving a handover request sent by a serving base station;

sending, to a base station of at least one configured cell or at least one configured base station that can provide, together with a current base station, a multi-connectivity service to user equipment, a request for providing a multi-connectivity service to the user equipment; and after an acknowledgment sent by the base station of the at least one cell or the at least one base station is received, providing, together with the base station of the at least one cell or the at least one base station, a multi-connectivity service to the user equipment.

With reference to the second aspect, in a first possible implementation manner, before the step of sending, to abase station of at least one configured cell or at least one configured base station that together can provide a multi-connectivity service to user equipment, a request for providing a multi-connectivity service to the user equipment, the method further includes:

determining, according to configured indication information used for controlling handover of the user equipment, the base station of the at least one cell or the at least one base station that can provide, together with the current base station, a multi-connectivity service to the user equipment.

With reference to the first possible implementation manner of the second aspect, in a second possible implementation manner, before the step of receiving a handover request sent by a serving base station, the method further includes:

sending adjacent cell information of a serving cell of the current base station to the serving base station, where the adjacent cell information includes the indication information used for controlling handover of the user equipment.

With reference to the first possible implementation manner of the second aspect, in a third possible implementation manner, before the step of receiving a handover request sent by a serving base station, the method further includes:

receiving the indication information that is configured by an operations, administration, and maintenance entity OAM and that is used for controlling handover of the user equipment.

A third aspect of the present embodiment of the invention provides a method for controlling handover of user equipment, including:

receiving indication information, used for controlling handover of user equipment, broadcast by at least one base station providing a multi-connectivity service, where the indication information is used for indicating a cell or base station that can provide a multi-connectivity service to the user equipment; and sending a measurement report to a serving base station, where the measurement report carries the indication information used for controlling handover of the user equipment, so that the serving base station determines, according to the indication information, from the cell or base station that can provide a multi-connectivity service to the user equipment, a target cell or a target base station for handover, and further, a base station of the target cell or the target base station provides a connectivity service to the user equipment.

With reference to the third aspect, in a first possible implementation manner, the method further includes:

after a handover response sent by the serving base station is received, performing handover from the serving base station to the target base station.

A fourth aspect of the present embodiment of the invention provides a base station, including:

an acquiring unit, configured to acquire indication information used for controlling handover of user equipment, where the indication information is used for indicating a cell or base station that can provide a multi-connectivity service to the user equipment;

a determining unit, configured to determine, according to the indication information acquired by the acquiring unit, from the cell or base station that can provide a multi-connectivity service to the user equipment, a target cell or a target base station for handover; and a sending unit, configured to send a handover request to a base station of the target cell determined by the determining unit or the target base station determined by the determining unit, so that the base station of the target cell or the target base station provides a connectivity service to the user equipment.

With reference to the fourth aspect, in a first possible implementation manner, the acquiring unit is configured to: acquire adjacent cell information of a serving cell of a base station of a cell providing a multi-connectivity service or adjacent cell information of a serving cell of abase station providing a multi-connectivity service, where the adjacent cell information includes the indication information; and read the indication information from the adjacent cell information.

With reference to the fourth aspect, in a second possible implementation manner, the acquiring unit is configured to receive the indication information configured by an operations, administration, and maintenance entity OAM.

With reference to the fourth aspect, in a third possible implementation manner, the acquiring unit is configured to receive the indication information reported by the user equipment.

With reference to the fourth aspect, or any one of the first to third possible implementation manners of the fourth aspect, in a fourth possible implementation manner, when the indication information is an inter-cell multi-connectivity indication identifier, the determining unit is configured to determine, according to the inter-cell multi-connectivity indication identifier, from the cell that can provide a multi-connectivity service to the user equipment, the target cell for handover; and the sending unit is configured to send the handover request to the base station of the target cell, so that the base station of the target cell provides a connectivity service to the user equipment.

With reference to the fourth aspect, or any one of the first to third possible implementation manners of the fourth aspect, in a fifth possible implementation manner, when the indication information is an inter-base station multi-connectivity indication identifier, the determining unit is configured to determine, according to the inter-base station multi-connectivity indication identifier, from the base station that can provide a multi-connectivity service to the user equipment, the target base station for handover; and the sending unit is configured to send the handover request to the target base station, so that the target base station provides a connectivity service to the user equipment.

With reference to the fourth aspect, or any one of the first to third possible implementation manners of the fourth aspect, in a sixth possible implementation manner, when the indication information is multiple cell identifiers ECGIs, the determining unit is configured to search the multiple ECGIs for at least one ECGI whose base station identifier field is different from a base station identifier field of a serving base station; and the sending unit is configured to send the handover request to the target base station, where the handover request carries an ECGI whose base station identifier field is the target base station, so that the target base station provides a connectivity service to the user equipment.

A fifth aspect of the present embodiment of the invention provides a base station, including:

a receiving unit, configured to receive a handover request sent by a serving base station;

a sending unit, configured to send, to a base station of at least one configured cell or at least one configured base station that can provide, together with the current base station, a multi-connectivity service to user equipment, a request for providing a multi-connectivity service to the user equipment, where the receiving unit is further configured to receive an acknowledgment sent by the base station of the at least one cell or the at least one base station; and a multi-connectivity unit, configured to: after the receiving unit receives the acknowledgment sent by the base station of the at least one cell or the at least one base station, provide, together with the base station of the at least one cell or the at least one base station, a multi-connectivity service to the user equipment.

With reference to the fifth aspect, in a first possible implementation manner, the base station further includes:

a determining unit, configured to determine, according to configured indication information used for controlling handover of the user equipment, the base station of the at least one cell or the at least one base station that can provide, together with the current base station, a multi-connectivity service to the user equipment.

With reference to the first possible implementation manner of the fifth aspect, in a second possible implementation manner, the sending unit is further configured to send adjacent cell information of a serving cell of the current base station to the serving base station, where the adjacent cell information includes the indication information used for controlling handover of the user equipment.

With reference to the first possible implementation manner of the fifth aspect, in a third possible implementation manner, the receiving unit is further configured to receive the indication information that is configured by an operations, administration, and maintenance entity OAM and that is used for controlling handover of the user equipment.

A sixth aspect of the present embodiment of the invention provides user equipment, including:

a receiving unit, configured to receive indication information, used for controlling handover of the user equipment, broadcast by at least one base station providing a multi-connectivity service, where the indication information is used for indicating a cell or base station that can provide a multi-connectivity service to the user equipment; and a sending unit, configured to send a measurement report to a serving base station, where the measurement report carries the indication information used for controlling handover of the user equipment, so that the serving base station determines, according to the indication information, from the cell or base station that can provide a multi-connectivity service to the user equipment, a target cell or a target base station for handover, and further, a base station of the target cell or the target base station provides a connectivity service to the user equipment.

With reference to the sixth aspect, in a first possible implementation manner, the user equipment further includes:

the receiving unit, further configured to receive a handover response sent by the serving base station; and a handover unit, configured to: after the receiving unit receives the handover response sent by the serving base station, perform handover from the serving base station to the target base station.

A seventh aspect of the present embodiment of the invention provides a base station, including: an input device, an output device, a processor, and a memory, where the input device is configured to acquire indication information used for controlling handover of user equipment, where the indication information is used for indicating a cell or base station that can provide a multi-connectivity service to the user equipment;

the processor is configured to determine, according to the indication information, from the cell or base station that can provide a multi-connectivity service to the user equipment, a target cell or a target base station for handover; and the output device is configured to send a handover request to a base station of the target cell or the target base station, so that the base station of the target cell or the target base station provides a connectivity service to the user equipment.

An eighth aspect of the present embodiment of the invention provides a base station, including: an input device, an output device, a processor, and a memory, where the input device is configured to receive a handover request sent by a serving base station;

the output device is configured to send, to a base station of at least one configured cell or at least one configured base station that can provide, together with the current base station, a multi-connectivity service to user equipment, a request for providing a multi-connectivity service to the user equipment; and the processor is configured to: after an acknowledgment sent by the base station of the at least one cell or the at least one base station is received, provide, together with the base station of the at least one cell or the at least one base station, a multi-connectivity service to the user equipment.

A ninth aspect of the present embodiment of the invention provides user equipment, including: an input device, an output device, a processor, and a memory, where the input device is configured to receive indication information, used for controlling handover of the user equipment, broadcast by at least one base station providing a multi-connectivity service, where the indication information is used for indicating a cell or base station that can provide a multi-connectivity service to the user equipment; and the output device is configured to send a measurement report to a serving base station, where the measurement report carries the indication information used for controlling handover of the user equipment, so that the serving base station determines, according to the indication information, from the cell or base station that can provide a multi-connectivity service to the user equipment, a target cell or a target base station for handover, and further, a base station of the target cell or the target base station provides a connectivity service to the user equipment.

A tenth aspect of the present embodiment of the invention provides a communications system, including: user equipment, a serving base station, a target base station, and at least one base station that provides, together with the target base station or the serving base station, a multi-connectivity service to the user equipment, where the serving base station is the base station according to the foregoing technical solutions;

the target base station is the base station according to the foregoing technical solutions; and the user equipment is the user equipment according to the foregoing technical solutions.

In the embodiments of the present embodiment of the invention, indication information used for controlling handover of user equipment is acquired, where the indication information is used for indicating a cell or base station that can provide a multi-connectivity service to the user equipment; a target cell or a target base station for handover is determined according to the indication information, from the cell or base station that can provide a multi-connectivity service to the user equipment; and a handover request is sent to a base station of the target cell or the target base station, so that the base station of the target cell or the target base station provides a connectivity service to the user equipment. In comparison with the prior art in which a serving base station does not know another base station that can also provide a dual-connectivity service to user equipment, by means of the method for controlling handover of user equipment according to the embodiments of the present embodiment of the invention, user equipment can be accurately handed over to a base station that provides a multi-connectivity service to the user equipment.

BRIEF DESCRIPTION OF THE DRAWINGS

To describe the technical solutions in the embodiments of the present embodiment of the invention more clearly, the following briefly introduces the accompanying drawings required for describing the embodiments. Apparently, the accompanying drawings in the following description show merely some embodiments of the present embodiment of the invention, and a person skilled in the art may still derive other drawings from these accompanying drawings without creative efforts.

DETAILED DESCRIPTION

Embodiments of the present embodiment of the invention provide a method for controlling handover of user equipment, so that it can be ensured that user equipment is handed over to a base station that can provide a multi-connectivity service to the user equipment. The embodiments of the present embodiment of the invention further provide a corresponding base station, corresponding user equipment, and a corresponding system. Detailed description is provided below separately.

The following clearly and completely describes the technical solutions in the embodiments of the present embodiment of the invention with reference to the accompanying drawings in the embodiments of the present embodiment of the invention. Apparently, the described embodiments are some of the embodiments of the present embodiment of the invention rather than all of the embodiments. All other embodiments obtained by a person of ordinary skill in the art based on the embodiments of the present embodiment of the invention without creative efforts shall fall within the protection scope of the present embodiment of the invention.

Multi-connectivity in the embodiments of the present embodiment of the invention refers to that user equipment can keep connections to multiple base stations or cells in multiple base stations simultaneously, and may be, for example, dual-connectivity, triple-connectivity, or four-connectivity. A quantity of base stations or cells that are specifically connected is not limited.

Figure 1:
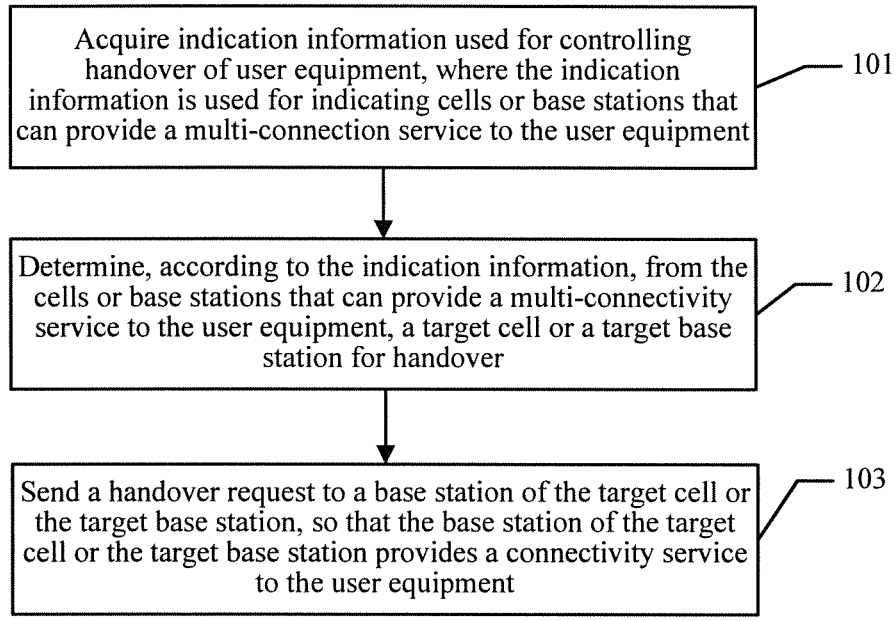
FIG. 1 is a schematic diagram of an embodiment of a method for controlling handover of user equipment according to an embodiment of the present embodiment of the invention.

Referring to FIG. 1, an embodiment of a method for controlling handover of user equipment according to an embodiment of the present embodiment of the invention includes:

101: Acquire indication information used for controlling handover of user equipment, where the indication information is used for indicating a cell or base station that can provide a multi-connectivity service to the user equipment.

In this embodiment of the present embodiment of the invention, dual-connectivity is used as an example. When base stations that are providing a service to the user equipment UE are eNB1 and eNB2, eNB1 acquires indication information that eNB2 and eNB3 can provide a dual-connectivity service to the UE, where the indication information acquired by eNB1 is used for indicating that a base station that can provide a dual-connectivity service to the UE is eNB1 and eNB2, or, eNB2 and eNB3.

When base stations that are providing a service to the user equipment UE are a cell 1 of eNB1 and a cell 2 of eNB2, eNB1 acquires indication information that the cell 2 of eNB2 and a cell 3 of eNB3 can provide a dual-connectivity service to the UE, where the indication information acquired by eNB1 is used for indicating that a cell that can provide a dual-connectivity service to the UE is the cell 1 of eNB1 and the cell 2 of eNB2, or, the cell 2 of eNB2 and the cell 3 of eNB3.

102. Determine, according to the indication information, from the cell or base station that can provide a multi-connectivity service to the user equipment, a target cell or a target base station for handover.

For example, in the example in the previous step, eNB1 may determine according to the indication information that the target cell for handover is the cell 3 of eNB3, or, determine according to the indication information that the target base station for handover is eNB3.

103: Send a handover request to a base station of the target cell or the target base station, so that the base station of the target cell or the target base station provides a connectivity service to the user equipment.

After eNB1 determines that the target cell for handover is the cell 3 of eNB3, or, eNB1 determines that the target base station for handover is eNB3, eNB1 may send a handover request to eNB3, so that eNB3 and eNB2 together provide a dual-connectivity service to the UE.

In this embodiment of the present embodiment of the invention, indication information used for controlling handover of user equipment is acquired, where the indication information is used for indicating a cell or base station that can provide a multi-connectivity service to the user equipment; a target cell or a target base station for handover is determined according to the indication information, from the cell or base station that can provide a multi-connectivity service to the user equipment; and a handover request is sent to a base station of the target cell or the target base station, so that the base station of the target cell or the target base station provides a connectivity service to the user equipment. In comparison with the prior art in which a serving base station does not know another adjacent base station that can provide a dual-connectivity service to user equipment, by means of the method for controlling handover of user equipment according to this embodiment of the present embodiment of the invention, user equipment can be accurately handed over to a base station that can provide a multi-connectivity service to the user equipment.

Optionally, on the basis of the embodiment corresponding to FIG. 1 above, in another embodiment of the method for controlling handover of user equipment according to this embodiment of the present embodiment of the invention, the acquiring indication information used for controlling handover of user equipment may include:

acquiring adjacent cell information of a serving cell of a base station of a cell providing a multi-connectivity service or adjacent cell information of a serving cell of a base station providing a multi-connectivity service, where the adjacent cell information includes the indication information; and reading the indication information from the adjacent cell information.

In this embodiment of the present embodiment of the invention, the indication information acquired by a base station may be transferred by using an inter-base station interface. For example, when a communication interface is established between eNB1 and eNB2, or when a configuration of the base station is updated, eNB1 acquires adjacent cell information of a serving cell of eNB2 by using the communication interface between eNB1 and eNB2. The adjacent cell information may be represented by using an adjacent cell information list. When the adjacent cell information list includes dual-connectivity indication information, the dual-connectivity indication information is used for indicating whether the serving cell of eNB2 can provide, together with an adjacent cell of the serving cell, a dual-connectivity service.

In this embodiment of the present embodiment of the invention, the dual-connectivity indication information may be represented by using an inter-cell dual-connectivity indication identifier or represented by using an inter-base station dual-connectivity indication identifier. For example: when the indication information is an inter-cell dual-connectivity indication identifier, the indication information is used for indicating that the cell 2 of eNB2 and the cell 3 of eNB3 can provide a dual-connectivity service to the user equipment; when the indication information is an inter-base station dual-connectivity indication identifier, the indication information is used for indicating that eNB2 and eNB3 can provide a dual-connectivity service to the user equipment.

Optionally, on the basis of the embodiment corresponding to FIG. 1 above, in another embodiment of the method for controlling handover of user equipment according to this embodiment of the present embodiment of the invention, the acquiring indication information used for controlling handover of user equipment may include:

receiving the indication information configured by an operations, administration, and maintenance entity OAM.

In this embodiment of the present embodiment of the invention, the operations, administration, and maintenance entity (OAM) may configure dual-connectivity indication information for each base station. For example: indication information that the cell 1 of eNB1 and the cell 2 of eNB2 together can provide a dual-connectivity service to the UE and indication information that the cell 2 of eNB2 and the cell 3 of eNB3 together can provide a dual-connectivity service to the UE are separately configured for eNB1, eNB2, and eNB3. In this way, when eNB1 is a serving base station serving the UE, when it is ready to perform handover, the UE may be handed over to eNB2 and/or eNB3 according to the foregoing indication information. In this embodiment of the present embodiment of the invention, the serving base station provides an RRC service to the UE, or terminates an S1 connection of the UE.

Optionally, on the basis of the embodiment corresponding to FIG. 1 above, in another embodiment of the method for controlling handover of user equipment according to this embodiment of the present embodiment of the invention, the acquiring indication information used for controlling handover of user equipment may include:

receiving the indication information reported by the user equipment.

In this embodiment of the present embodiment of the invention, for example, when eNB2 can provide, together with eNB1, a dual-connectivity service to the UE, and eNB2 can also provide, together with eNB3, a dual-connectivity service to the UE, eNB2 may broadcast the dual-connectivity indication information, where the dual-connectivity indication information is indication information used for indicating that eNB2 can provide, together with eNB1, a dual-connectivity service to the UE and that eNB2 can also provide, together with eNB3, a dual-connectivity service to the UE. After reading a broadcast message of eNB2, the UE may send, to eNB1 by using a measurement report, the dual-connectivity indication information broadcast by eNB2. In this way, when eNB1 controls handover of the UE, eNB3 may be selected, so that after handover, eNB3 and eNB2 provide a dual-connectivity service to the UE.

Optionally, on the basis of the embodiment corresponding to FIG. 1 above and any optional embodiment, in another embodiment of the method for controlling handover of user equipment according to this embodiment of the present embodiment of the invention, when the indication information is an inter-cell multi-connectivity indication identifier, the determining, according to the indication information, from the cell or base station that can provide a multi-connectivity service to the user equipment, a target cell or a target base station for handover includes:

determining, according to the inter-cell multi-connectivity indication identifier, from the cell that can provide a multi-connectivity service to the user equipment, the target cell for handover; and correspondingly, the sending a handover request to a base station of the target cell or the target base station, so that the base station of the target cell or the target base station provides a connectivity service to the user equipment includes:

sending the handover request to the base station of the target cell, so that the base station of the target cell provides a connectivity service to the user equipment.

In this embodiment of the present embodiment of the invention, the indication information may be inter-cell multi-connectivity indication information, or may be inter-base station multi-connectivity indication information. When the indication information is inter-cell multi-connectivity indication information, a serving base station may determine a target cell for handover. For example, when eNB1 determines that the target cell for handover is the cell 2 of eNB2, during handover by eNB1, eNB1 may send a handover request to eNB2, to let eNB2 provide a multi-connectivity service to the UE.

Optionally, on the basis of the embodiment corresponding to FIG. 1 above and any optional embodiment, in another embodiment of the method for controlling handover of user equipment according to this embodiment of the present embodiment of the invention, when the indication information is an inter-base station multi-connectivity indication identifier, the determining, according to the indication information, from the cell or base station that can provide a multi-connectivity service to the user equipment, a target cell or a target base station for handover includes:

determining, according to the inter-base station multi-connectivity indication identifier, from the base station that can provide a multi-connectivity service to the user equipment, the target base station for handover; and correspondingly, the sending a handover request to a base station of the target cell or the target base station, so that the base station of the target cell or the target base station provides a connectivity service to the user equipment includes:

sending the handover request to the target base station, so that the target base station provides a connectivity service to the user equipment.

In this embodiment of the present embodiment of the invention, the indication information may be inter-cell multi-connectivity indication information, or may be inter-base station multi-connectivity indication information. When the indication information is inter-base station multi-connectivity indication information, the serving base station may determine the target base station for handover. For example, when eNB1 determines that the target base station for handover is eNB2, when eNB1 controls handover, eNB1 may send a handover request to eNB2, to let eNB2 provide a multi-connectivity service to the UE.

Optionally, on the basis of the embodiment corresponding to FIG. 1 above and any optional embodiment, in another embodiment of the method for controlling handover of user equipment according to this embodiment of the present embodiment of the invention, when the indication information is multiple cell identifiers ECGIs, the determining, according to the indication information, from the cell or base station that can provide a multi-connectivity service to the user equipment, a target cell or a target base station for handover includes:

searching the multiple ECGIs for at least one ECGI whose base station identifier field is different from a base station identifier field of a serving base station; and determining the target base station from a base station corresponding to the at least one ECGI; and correspondingly, the sending a handover request to a base station of the target cell or the target base station, so that the base station of the target cell or the target base station provides a connectivity service to the user equipment includes:

sending the handover request to the target base station, where the handover request carries an ECGI whose base station identifier field is the target base station, so that the target base station provides a connectivity service to the user equipment.

The indication information in this embodiment of the present embodiment of the invention may be implicit indication information, and is indicated by using an evolved universal terrestrial radio access network (E-UTRAN) cell identifier (Cell Global Identifier, ECGI). For example, when eNB1 acquires two ECGIs provided by eNB2, namely, ECGI1 and ECGI2, and when a base station identifier field in ECGI1 is the same as a base station identifier of eNB2, and a base station identifier field in ECGI2 is the same as a base station identifier of eNB3, eNB1 may learn that eNB2 and eNB3 can provide a dual-connectivity service to the UE. In this way, during control of handover of the UE, the UE may be controlled to be handed over to eNB2 and/or eNB3.

Figure 2:
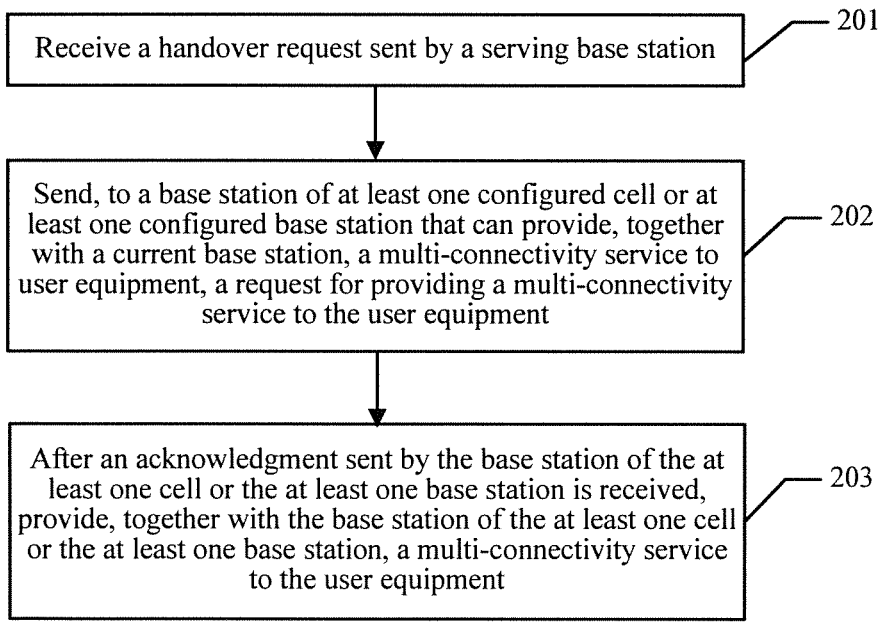
FIG. 2 is a schematic diagram of another embodiment of a method for controlling handover of user equipment according to an embodiment of the present embodiment of the invention.

Referring to FIG. 2, from the perspective that a target base station is an execution body, an embodiment of a method for controlling handover of user equipment according to an embodiment of the present embodiment of the invention includes:

201: Receive a handover request sent by a serving base station.

202: Send, to a base station of at least one configured cell or at least one configured base station that can provide, together with a current base station, a multi-connectivity service to user equipment, a request for providing a multi-connectivity service to the user equipment.

203: After an acknowledgment sent by the base station of the at least one cell or the at least one base station is received, provide, together with the base station of the at least one cell or the at least one base station, a multi-connectivity service to the user equipment.

In this embodiment of the present embodiment of the invention, a handover request sent by a serving base station is received; a request for providing a multi-connectivity service to user equipment is sent to a base station of at least one configured cell or at least one configured base station that can provide, together with a current base station, a multi-connectivity service to the user equipment; and after an acknowledgment sent by the base station of the at least one cell or the at least one base station is received, a multi-connectivity service is provided, together with the base station of the at least one cell or the at least one base station, to the user equipment. In comparison with the prior art in which a serving base station does not know another adjacent base station that can provide a dual-connectivity service to user equipment, by means of the method for controlling handover of user equipment according to this embodiment of the present embodiment of the invention, a serving base station can accurately hand over user equipment to a base station that can provide a multi-connectivity service to the user equipment.

On the basis of the embodiment corresponding to FIG. 2 above, in an optional embodiment of the method for controlling handover of user equipment according to this embodiment of the present embodiment of the invention, before the step of sending, to a base station of at least one configured cell or at least one configured base station that together can provide a multi-connectivity service to user equipment, a request for providing a multi-connectivity service to the user equipment, the method may further include:

determining, according to configured indication information used for controlling handover of the user equipment, the base station of the at least one cell or the at least one base station that can provide, together with the current base station, a multi-connectivity service to the user equipment.

Optionally, on the basis of the optional embodiment corresponding to FIG. 2 above, in another optional embodiment of the method for controlling handover of user equipment according to this embodiment of the present embodiment of the invention, before the step of receiving a handover request sent by a serving base station, the method may further include:

sending adjacent cell information of a serving cell of the current base station to the serving base station, where the adjacent cell information includes the indication information used for controlling handover of user equipment.

In this embodiment of the present embodiment of the invention, when the target base station has stored adjacent cell information, the adjacent cell information may be stored in an adjacent cell information list, and the adjacent cell information list may be sent to the serving base station. The adjacent cell information list includes dual-connectivity indication information, and the dual-connectivity indication information is used for indicating whether a serving cell of eNB2 and an adjacent cell of the serving cell together can provide a dual-connectivity service.

In this embodiment of the present embodiment of the invention, the dual-connectivity indication information may be represented by using an inter-cell dual-connectivity indication identifier or represented by using an inter-base station dual-connectivity indication identifier. For example: when the indication information is inter-cell dual-connectivity indication identifier, the indication information is used for indicating that a cell 2 of eNB2 and a cell 3 of eNB3 can provide a dual-connectivity service to the user equipment; when the indication information is an inter-base station dual-connectivity indication identifier, the indication information is used for indicating that eNB2 and eNB3 can provide a dual-connectivity service to the user equipment.

Optionally, on the basis of the optional embodiment corresponding to FIG. 2 above, in another optional embodiment of the method for controlling handover of user equipment according to this embodiment of the present embodiment of the invention, before the step of receiving a handover request sent by a serving base station, the method may further include:

receiving the indication information that is configured by an operations, administration, and maintenance entity OAM and that is used for controlling handover of the user equipment.

In this embodiment of the present embodiment of the invention, the operations, administration, and maintenance entity (OAM) may configure dual-connectivity indication information for each base station. For example: indication information that a cell 1 of eNB1 and the cell 2 of eNB2 together can provide a dual-connectivity service to the UE and indication information that the cell 2 of eNB2 and the cell 3 of eNB3 together can provide a dual-connectivity service to the UE are separately configured for eNB1, eNB2, and eNB3. In this way, when eNB1 is a serving base station serving the UE, when it is ready to perform handover, the UE may be handed over to eNB2 and/or eNB3 according to the foregoing indication information. In this embodiment of the present embodiment of the invention, the serving base station provides an RRC service to the UE, or terminates an S1 connection of the UE.

Figure 3:
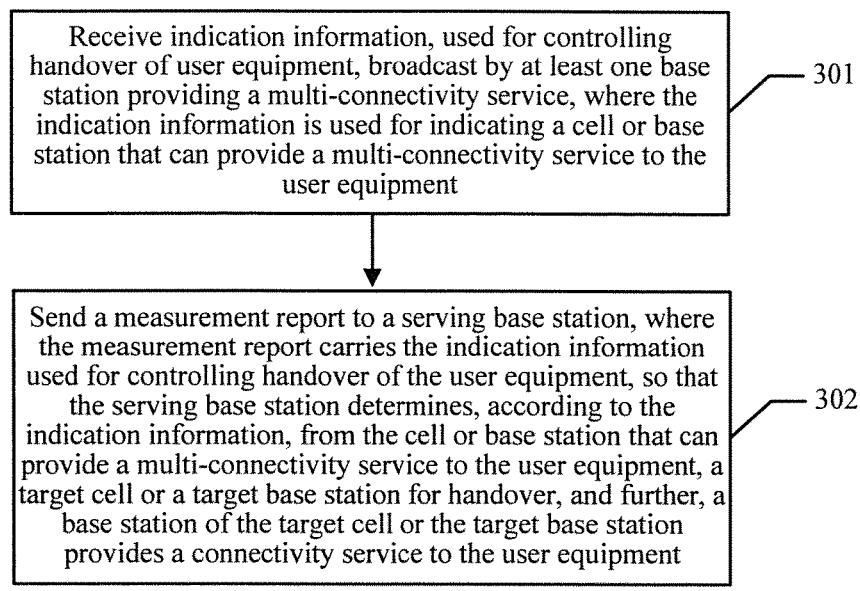
FIG. 3 is a schematic diagram of another embodiment of a method for controlling handover of user equipment according to an embodiment of the present embodiment of the invention.

Referring to FIG. 3, from the perspective that user equipment is an execution body, another embodiment of a method for controlling handover of user equipment according to an embodiment of the present embodiment of the invention includes:

301: Receive indication information, used for controlling handover of user equipment, broadcast by at least one base station providing a multi-connectivity service, where the indication information is used for indicating a cell or base station that can provide a multi-connectivity service to the user equipment.

302: Send a measurement report to a serving base station, where the measurement report carries the indication information used for controlling handover of the user equipment, so that the serving base station determines, according to the indication information, from the cell or base station that can provide a multi-connectivity service to the user equipment, a target cell or a target base station for handover, and further, a base station of the target cell or the target base station provides a connectivity service to the user equipment.

In this embodiment of the present embodiment of the invention, indication information, used for controlling handover of user equipment, broadcast by at least one base station providing a multi-connectivity service is received, where the indication information is used for indicating a cell or base station that can provide a multi-connectivity service to the user equipment; and a measurement report is sent to a serving base station, where the measurement report carries the indication information used for controlling handover of user equipment, so that the serving base station determines, according to the indication information, from the cell or base station that can provide a multi-connectivity service to the user equipment, a target cell or a target base station for handover, and further, a base station of the target cell or the target base station provides a connectivity service to the user equipment. In comparison with the prior art in which a serving base station does not know another adjacent base station that can provide a dual-connectivity service to user equipment, by means of the method for controlling handover of user equipment according to this embodiment of the present embodiment of the invention, a serving base station can accurately hand over user equipment to a base station that can provide a multi-connectivity service to the user equipment.

On the basis of the embodiment corresponding to FIG. 3 above, in another embodiment of the method for controlling handover of user equipment according to this embodiment of the present embodiment of the invention, the method further includes:

after a handover response sent by the serving base station is received, performing handover from the serving base station to the target base station.

For ease of understanding, several dual-connectivity application scenarios are used as examples below to describe in detail processes of controlling handover of user equipment in the embodiments of the present embodiment of the invention:

Although several application scenarios are described below by using an example of a networking architecture of a macro base station and a micro base station, in practice, the embodiments of the present embodiment of the invention are applicable between macro base stations and between micro base stations. Moreover, the base station in the embodiments of the present embodiment of the invention may be a wireless communication node in a form such as a macro base station, a small cell, a micro base station, a home base station, a micro cell node, a low power node, a relay station, a remote radio head (RRH), or an access point (AP).

Figure 4:
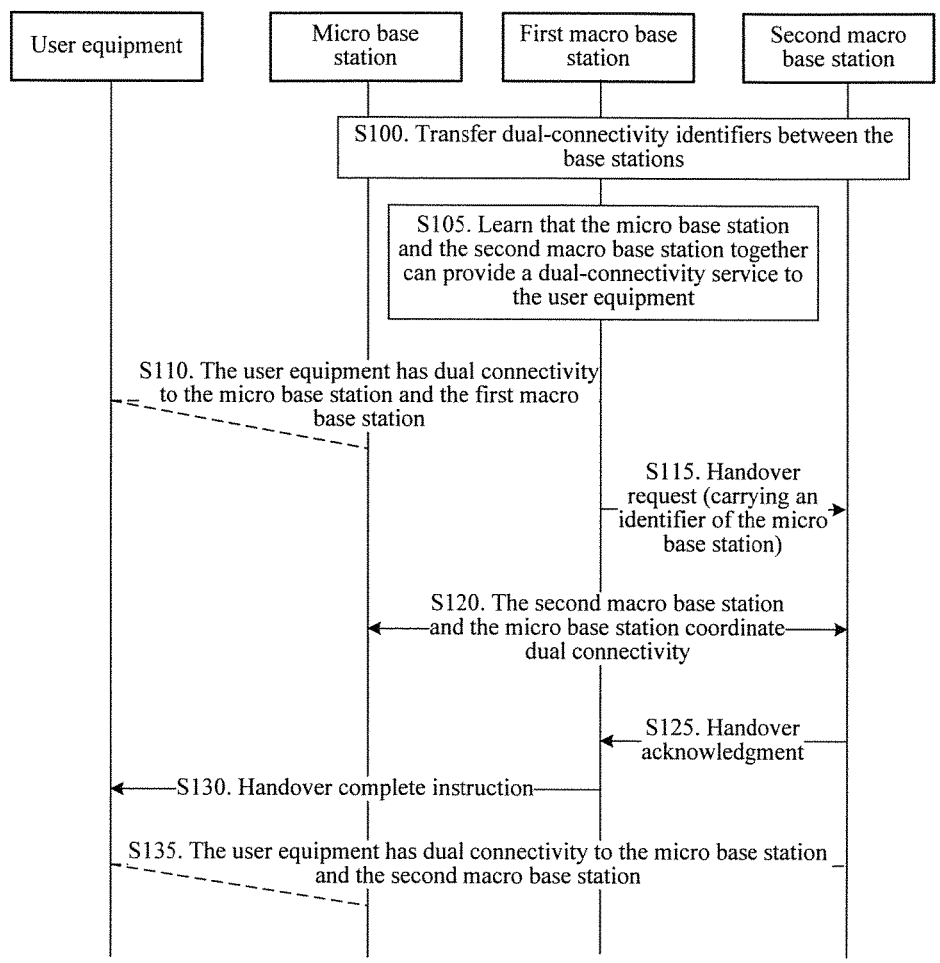
FIG. 4 is a schematic diagram of another embodiment of a method for controlling handover of user equipment according to an embodiment of the present embodiment of the invention.

Referring to FIG. 4, an embodiment of a method for controlling handover of user equipment shown in FIG. 4 includes:

S100: When communication interfaces are established between a micro base station, a first macro base station, and a second macro base station, the micro base station, the first macro base station, and the second macro base station separately carry inter-cell dual-connectivity identifiers in adjacent cell lists corresponding to info nation about serving cells of the micro base station, the first macro base station, and the second macro base station, to notify other base stations of the inter-cell dual-connectivity identifiers.

In this step, the inter-cell dual-connectivity identifier in the adjacent cell list of the micro base station is used for indicating that a cell 2 of the micro base station and a cell 1 of the first macro base station together can provide a dual-connectivity service to the user equipment, and also the cell 2 of the micro base station and a cell 3 of the second macro base station together can provide a dual-connectivity service to the user equipment.

S105: The first macro base station learns, by using the inter-cell dual-connectivity identifier in step S100, that a cell 2 of the micro base station and a cell 3 of the second macro base station together can provide a dual-connectivity service to the user equipment.

S110: Before handover of the user equipment, a cell 1 of the first macro base station and the cell 2 of the micro base station together provide a dual-connectivity service to the user equipment.

S115: The first macro base station sends a handover request to the second macro base station, where the handover request carries an identifier of the micro base station.

S120: The second macro base station and the micro base station coordinate a dual-connectivity service.

S125: The second macro base station sends a handover acknowledgment to the first macro base station.

S130: The first macro base station sends a handover complete instruction to the user equipment, so that the user equipment is handed over to the second macro base station.

S135: The user equipment has dual connectivity to the micro base station and the second macro base station, that is, the cell 2 of the micro base station and the cell 3 of the second macro base station provide a dual-connectivity service to the user equipment.

In this embodiment of the present embodiment of the invention, user equipment can be accurately handed over to a base station that provides a multi-connectivity service to the user equipment.

The embodiment shown in FIG. 3 is described by using an inter-cell dual-connectivity identifier as an example. In practice, the inter-cell dual-connectivity identifier in the embodiment shown in FIG. 2 may further be replaced with an inter-base station dual-connectivity identifier. An inter-base station dual-connectivity identifier is used for indicating that two base stations can perform a dual-connectivity service, that is, cells of the two base stations can all perform dual-connectivity, or is used for indicating that the two base stations can perform a dual-connectivity service, and in this case, unless it is specially identified that two specific cells cannot perform dual-connectivity, it is considered by default that all cells can perform a dual-connectivity service.

Figure 5:
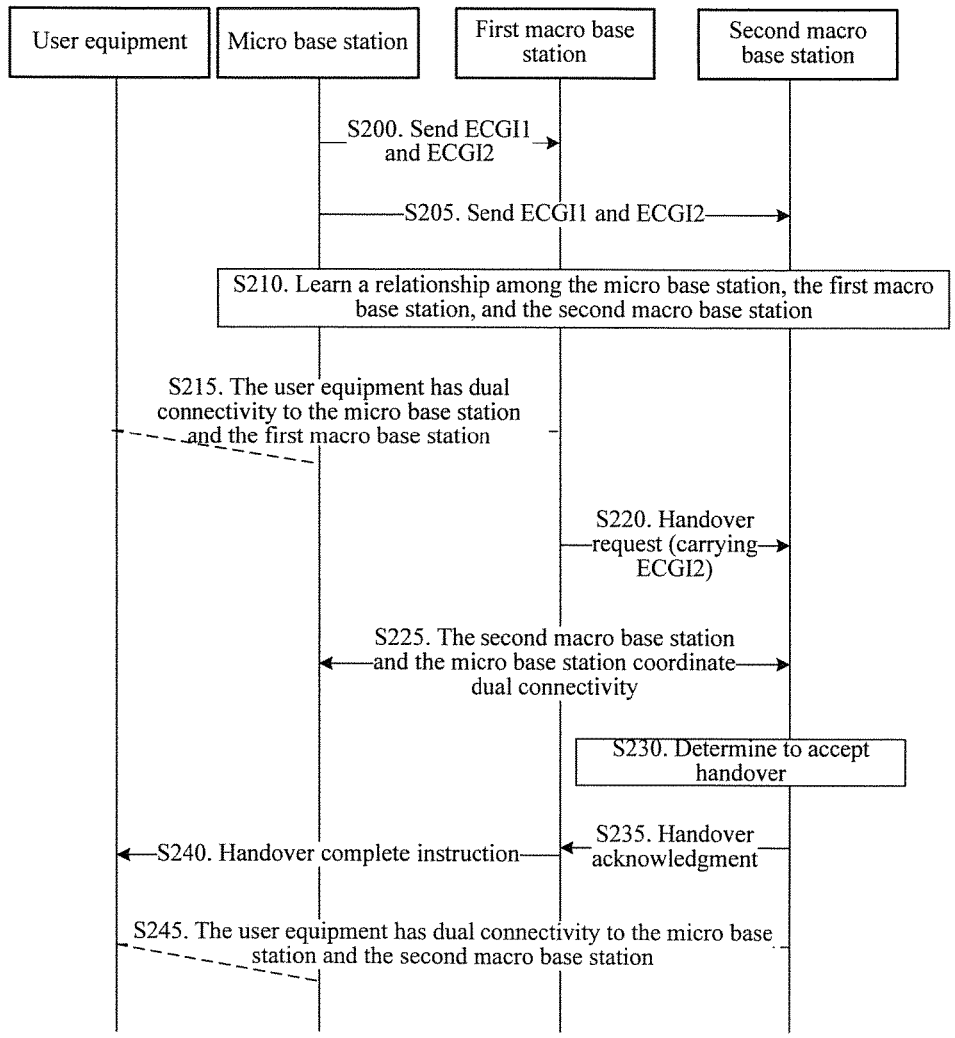
FIG. 5 is a schematic diagram of another embodiment of a method for controlling handover of user equipment according to an embodiment of the present embodiment of the invention.

Referring to FIG. 5, an embodiment of a method for controlling handover of user equipment shown in FIG. 5 includes:

S200: A micro base station sends ECGI1 and ECGI2 to a first macro base station.

In an LTE system, one base station has one eNB id, multiple provided cells share the eNB id, and cell identifier ECGI (28 bits) of each cell=eNB id (20 bits)+cell id (8 bits).

An eNB id included in ECGI1 is the same as that of the first macro base station, and an eNB id included in ECGI2 is the same as that of a second macro base station.

Herein, two ECGIs sent by the micro base station to the first macro base station and the second macro base station mean that:

(1) it indicates that the two ECGIs belong to one same cell, that is, one cell has two ECGIs, and the one cell can perform a dual-connectivity service with the first macro base station and the second macro base station; or (2) it indicates that the micro base station provides at least two serving cells, and each of the two ECGIs is for one macro base station. Therefore, it represents that the micro base station can perform a dual-connectivity service with the first macro base station and the second macro base station.

S205: The micro base station sends ECGI1 and ECGI2 to a second macro base station.

In this embodiment of the present embodiment of the invention, the micro base station may send ECGI1 and ECGI2 to the first macro base station and the second macro base station when communication interfaces are established between the micro base station and the first macro base station and between the micro base station and the second macro base station.

S210: The first macro base station and the second macro base station determine a relationship among the first macro base station, the second macro base station, and the micro base station according to ECGI1 and ECGI2.

The eNB id included in ECGI1 is the same as that of the first macro base station, and the eNB id included in ECGI2 is the same as that of the second macro base station. In this way, the first macro base station can learn, through ECGI2, that the micro base station and the second macro base station can provide a dual-connectivity service to the user equipment. The second macro base station can learn, through ECGI1, that the first macro base station and the micro base station can provide a dual-connectivity service to the user equipment.

S215: Before handover of the user equipment, a cell 1 of the first macro base station and a cell 2 of the micro base station together provide a dual-connectivity service to the user equipment.

S220: The first macro base station sends a handover request to the second macro base station, where the handover request carries ECGI2.

S225: The second macro base station and the micro base station coordinate a dual-connectivity service.

S230: The second macro base station determines to accept handover.

S235: The second macro base station sends a handover acknowledgment to the first macro base station.

S240: The first macro base station sends a handover complete instruction to the user equipment, so that the user equipment is handed over to the second macro base station.

S245: The user equipment has dual connectivity to the micro base station and the second macro base station, that is, the cell 2 of the micro base station and a cell 3 of the second macro base station provide a dual-connectivity service to the user equipment.

Figure 6:
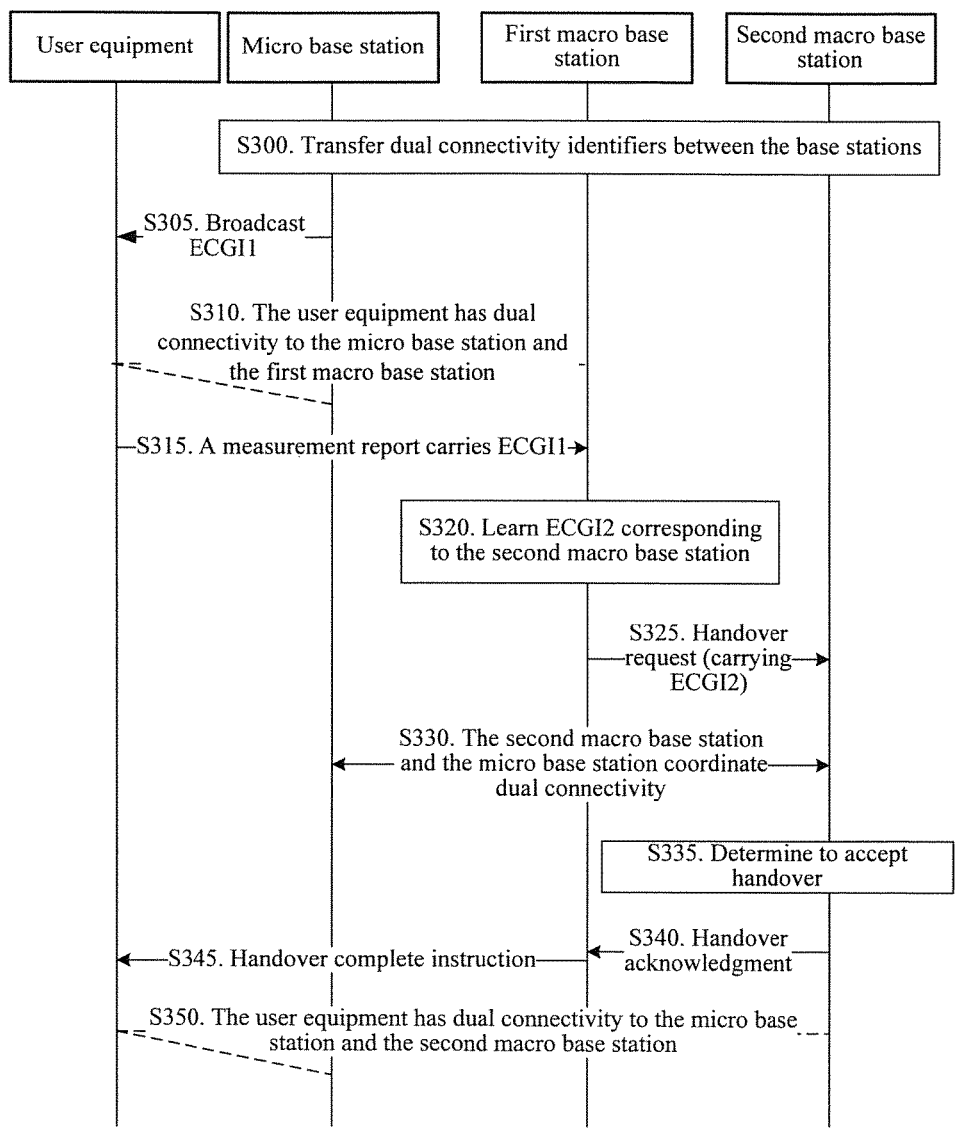
FIG. 6 is a schematic diagram of another embodiment of a method for controlling handover of user equipment according to an embodiment of the present embodiment of the invention.

Referring to FIG. 6, an embodiment of a method for controlling handover of user equipment shown in FIG. 6 includes:

S300: When communication interfaces are established between a micro base station, a first macro base station, and a second macro base station, the micro base station, the first macro base station, and the second macro base station carry inter-cell dual-connectivity identifiers in adjacent cell lists corresponding to information about serving cells, to notify the other two base stations of the inter-cell dual-connectivity identifiers.

In step S300, the first macro base station learns that the micro base station and the second macro base station can provide a dual-connectivity service to user equipment.

S305: The micro base station broadcasts ECGI1.

S310: Before handover of the user equipment, the first macro base station and the micro base station together provide a dual-connectivity service to the user equipment.

S315: The user equipment reports a measurement report of a cell corresponding to ECGI1 to the first macro base station, where the measurement report carries ECGI1.

S320: The first macro base station determines ECGI2 according to a dual-connectivity relationship between the micro base station and the second macro base station in step S300.

S325: The first macro base station sends a handover request to the second macro base station, where the handover request carries ECGI2.

S330: The second macro base station and the micro base station coordinate a dual-connectivity service.

S335: The second macro base station determines to accept handover.

S340: The second macro base station sends a handover acknowledgment to the first macro base station.

S345: The first macro base station sends a handover complete instruction to the user equipment, so that the user equipment is handed over to the second macro base station.

S350: The user equipment has dual connectivity to the micro base station and the second macro base station, that is, a cell 2 of the micro base station and a cell 3 of the second macro base station provide a dual-connectivity service to the user equipment.

Figure 7:
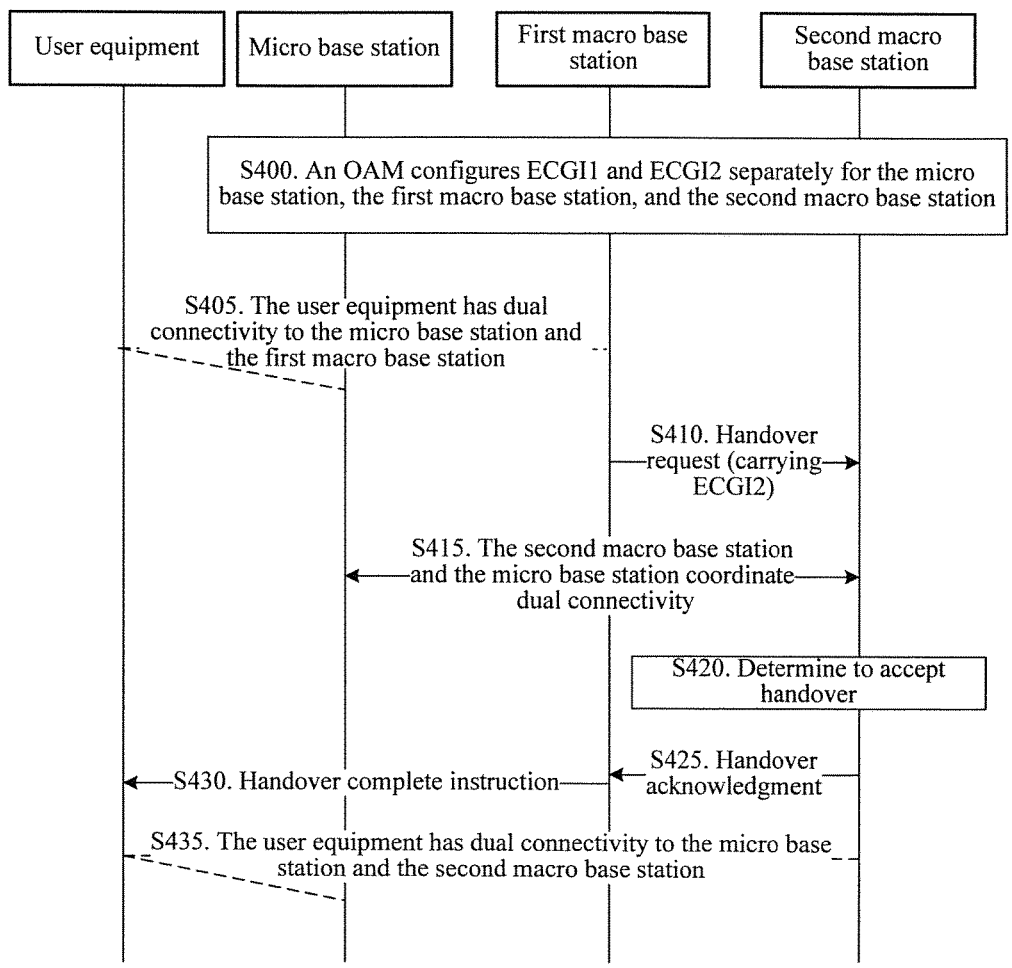
FIG. 7 is a schematic diagram of another embodiment of a method for controlling handover of user equipment according to an embodiment of the present embodiment of the invention.

Referring to FIG. 7, an embodiment of a method for controlling handover of user equipment shown in FIG. 7 includes:

S400: An OAM configures ECGI1 and ECGI2 separately for a micro base station, a first macro base station, and a second macro base station.

In this embodiment of the present embodiment of the invention, steps S405 to S435 are the same as steps S215 to S245, and details are not described herein again.

Figure 8:
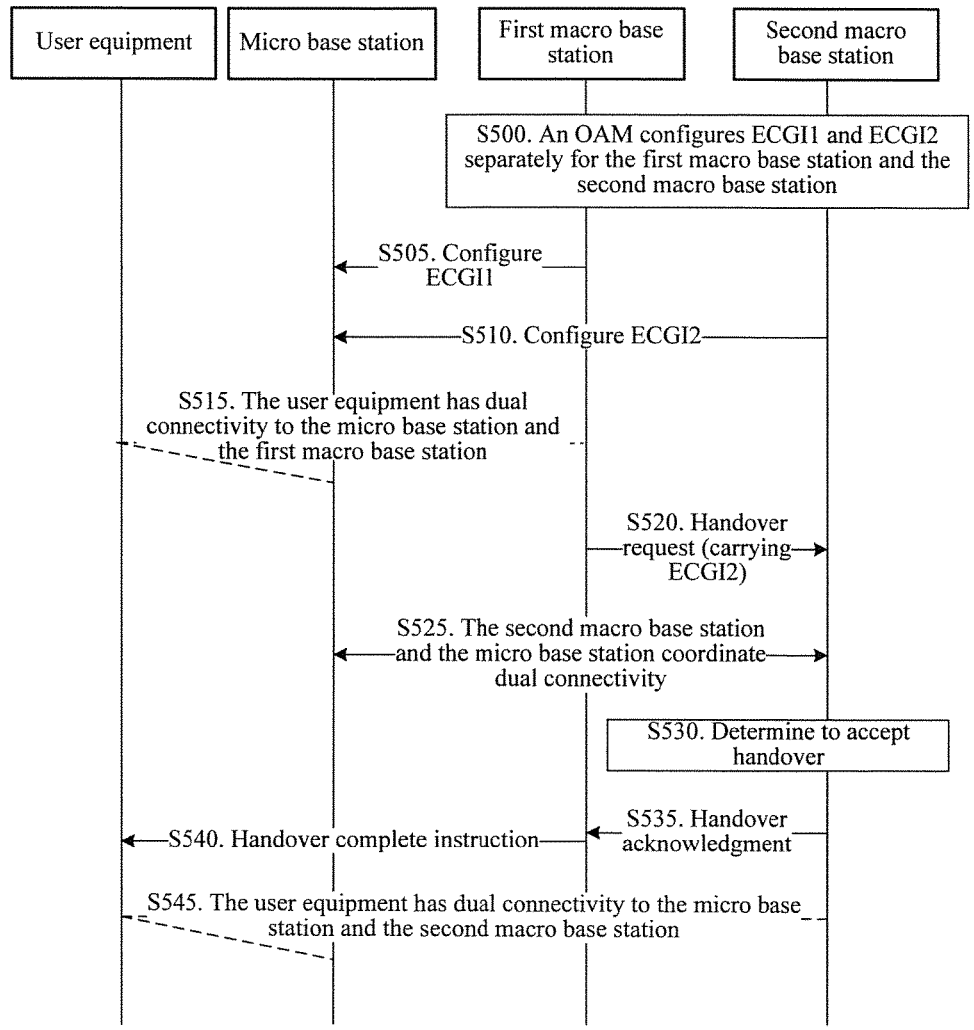
FIG. 8 is a schematic diagram of another embodiment of a method for controlling handover of user equipment according to an embodiment of the present embodiment of the invention.

Referring to FIG. 8, an embodiment of a method for controlling handover of user equipment shown in FIG. 8 includes:

S500: An OAM configures ECGI1 and ECGI2 separately for a first macro base station and a second macro base station.

S505: The first macro base station configures ECGI1 for a micro base station.

S510: The second macro base station configures ECGI2 for the micro base station.

In this embodiment of the present embodiment of the invention, steps S515 to S545 are the same as steps S215 to S245, and details are not described herein again.

Figure 9:
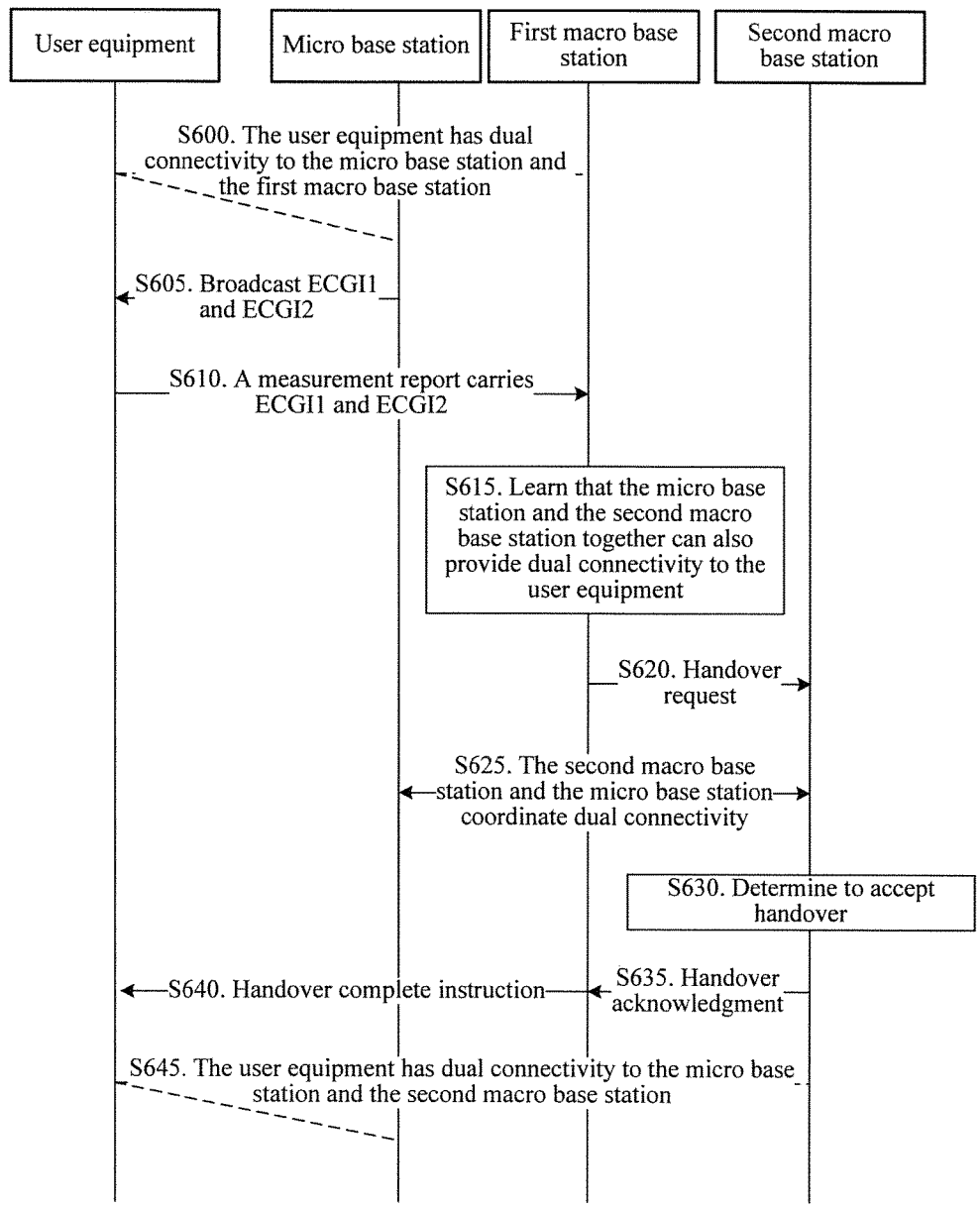
FIG. 9 is a schematic diagram of another embodiment of a method for controlling handover of user equipment according to an embodiment of the present embodiment of the invention.

Referring to FIG. 9, an embodiment of a method for controlling handover of user equipment shown in FIG. 9 includes:

S600: Before handover of user equipment, a first macro base station and a micro base station together provide a dual-connectivity service to the user equipment.

S605: The micro base station broadcasts ECGI1 and ECGI2.

S610: The user equipment sends a measurement report to the first macro base station, where the measurement report carries ECGI1 and ECGI2.

S615: The first macro base station learns, through ECGI1 and ECGI2 in step S610, that the micro base station and the second macro base station can also provide a dual-connectivity service to the user equipment together.

In this embodiment of the present embodiment of the invention, steps S620 to S645 are the same as steps S215 to S245, and details are not described herein again.

In this embodiment, at the same time when ECGI1 and ECGI2 are sent, one explicit dual-connectivity indication identifier is carried, to explicitly inform that ECGI1 and ECGI2 correspond to one same cell, where the cell can have dual connectivity to base stations corresponding to two eNB ids that are included in ECGI1 and ECGI2.

Figure 10:
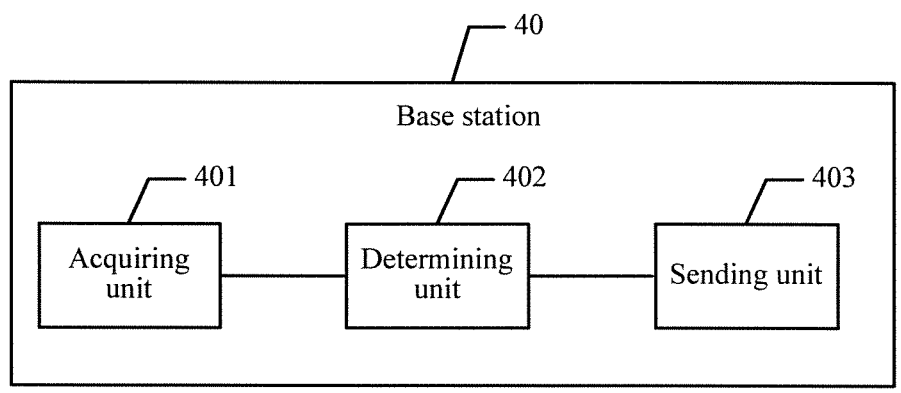
FIG. 10 is a schematic diagram of an embodiment of a base station according to an embodiment of the present embodiment of the invention.

Referring to FIG. 10, an embodiment of a base station according to an embodiment of the present embodiment of the invention includes:

an acquiring unit 401, configured to acquire indication information used for controlling handover of user equipment, where the indication information is used for indicating a cell or base station that can provide a multi-connectivity service to the user equipment;

a determining unit 402, configured to determine, according to the indication information acquired by the acquiring unit 401, from the cell or base station that can provide a multi-connectivity service to the user equipment, a target cell or a target base station for handover; and a sending unit 403, configured to send a handover request to a base station of the target cell determined by the determining unit 402 or the target base station determined by the determining unit 402, so that the base station of the target cell or the target base station provides a connectivity service to the user equipment.

In this embodiment of the present embodiment of the invention, the acquiring unit 401 acquires indication information used for controlling handover of user equipment, where the indication information is used for indicating a cell or base station that can provide a multi-connectivity service to the user equipment; the determining unit 402 determines, according to the indication information acquired by the acquiring unit 401, from the cell or base station that can provide a multi-connectivity service to the user equipment, a target cell or a target base station for handover; and the sending unit 403 sends a handover request to a base station of the target cell determined by the determining unit 402 or the target base station determined by the determining unit 402, so that the base station of the target cell or the target base station provides a connectivity service to the user equipment. In comparison with the prior art, the base station according to this embodiment of the present embodiment of the invention can accurately hand over user equipment to a base station that provides a multi-connectivity service to the user equipment.

Optionally, on the basis of the embodiment corresponding to FIG. 10 above, in another embodiment of the base station according to this embodiment of the present embodiment of the invention, the acquiring unit 401 is configured to: acquire adjacent cell information of a serving cell of a base station of a cell providing a multi-connectivity service or adjacent cell information of a serving cell of a base station providing a multi-connectivity service, where the adjacent cell information includes the indication information; and read the indication information from the adjacent cell information.

Optionally, on the basis of the embodiment corresponding to FIG. 10 above, in another embodiment of the base station according to this embodiment of the present embodiment of the invention, the acquiring unit 401 is configured to receive the indication information configured by an operations, administration, and maintenance entity OAM.

Optionally, on the basis of the embodiment corresponding to FIG. 10 above, in another embodiment of the base station according to this embodiment of the present embodiment of the invention, the acquiring unit 401 is configured to receive the indication information reported by the user equipment.

Optionally, on the basis of the embodiment corresponding to FIG. 10 above and any optional embodiment corresponding to FIG. 10, in another embodiment of the base station according to this embodiment of the present embodiment of the invention, when the indication information is an inter-cell multi-connectivity indication identifier, the determining unit 402 is configured to determine, according to the inter-cell multi-connectivity indication identifier, from the cell that can provide a multi-connectivity service to the user equipment, the target cell for handover; and the sending unit 403 is configured to send the handover request to the base station of the target cell, so that the base station of the target cell provides a connectivity service to the user equipment.

Optionally, on the basis of the embodiment corresponding to FIG. 10 above and any optional embodiment corresponding to FIG. 10, in another embodiment of the base station according to this embodiment of the present embodiment of the invention, when the indication information is an inter-base station multi-connectivity indication identifier, the determining unit 402 is configured to determine, according to the inter-base station multi-connectivity indication identifier, from the base station that can provide a multi-connectivity service to the user equipment, the target base station for handover; and the sending unit 403 is configured to send the handover request to the target base station, so that the target base station provides a connectivity service to the user equipment.

Optionally, on the basis of the embodiment corresponding to FIG. 10 above and any optional embodiment corresponding to FIG. 10, in another embodiment of the base station according to this embodiment of the present embodiment of the invention, when the indication information is multiple cell identifiers ECGIs, the determining unit 402 is configured to search the multiple ECGIs for at least one ECGI whose base station identifier field is different from a base station identifier field of a serving base station; and the sending unit 403 is configured to send the handover request to the target base station, where the handover request carries an ECGI whose base station identifier field is the target base station, so that the target base station provides a connectivity service to the user equipment.

Figure 11:
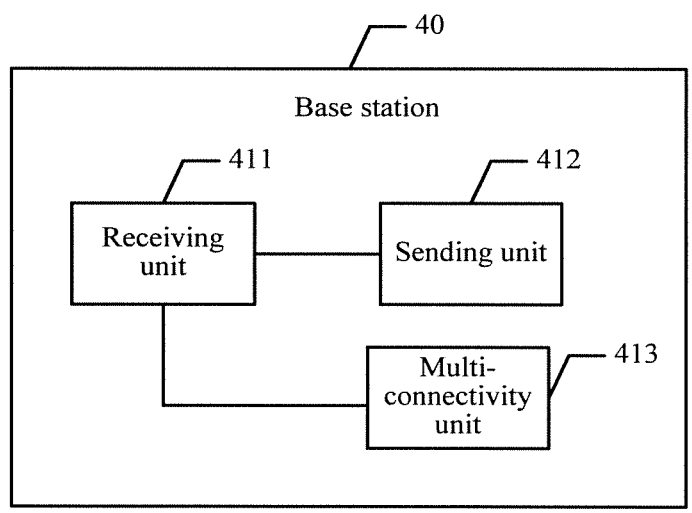
FIG. 11 is a schematic diagram of another embodiment of a base station according to an embodiment of the present embodiment of the invention.

Referring to FIG. 11, another embodiment of a base station according to an embodiment of the present embodiment of the invention includes:

a receiving unit 411, configured to receive a handover request sent by a serving base station;

a sending unit 412, configured to send, to a base station of at least one configured cell or at least one configured base station that can provide, together with the current base station, a multi-connectivity service to user equipment, a request for providing a multi-connectivity service to the user equipment, where the receiving unit 411 is further configured to receive an acknowledgment sent by the base station of the at least one cell or the at least one base station; and a multi-connectivity unit 413, configured to: after the receiving unit 411 receives the acknowledgment sent by the base station of the at least one cell or the at least one base station, provide, together with the base station of the at least one cell or the at least one base station, a multi-connectivity service to the user equipment.

In this embodiment of the present embodiment of the invention, the receiving unit 411 receives a handover request sent by a serving base station; the sending unit 412 sends, to a base station of at least one configured cell or at least one configured base station that can provide, together with the current base station, a multi-connectivity service to user equipment, a request for providing a multi-connectivity service to the user equipment; the receiving unit 411 further receives an acknowledgment sent by the base station of the at least one cell or the at least one base station; and after the receiving unit 411 receives the acknowledgment sent by the base station of the at least one cell or the at least one base station, the multi-connectivity unit 413 provides, together with the base station of the at least one cell or the at least one base station, a multi-connectivity service to the user equipment. In comparison with the prior art, the base station according to this embodiment of the present embodiment of the invention can enable a serving base station to accurately hand over user equipment to a base station that provides a multi-connectivity service to the user equipment.

Figure 12:
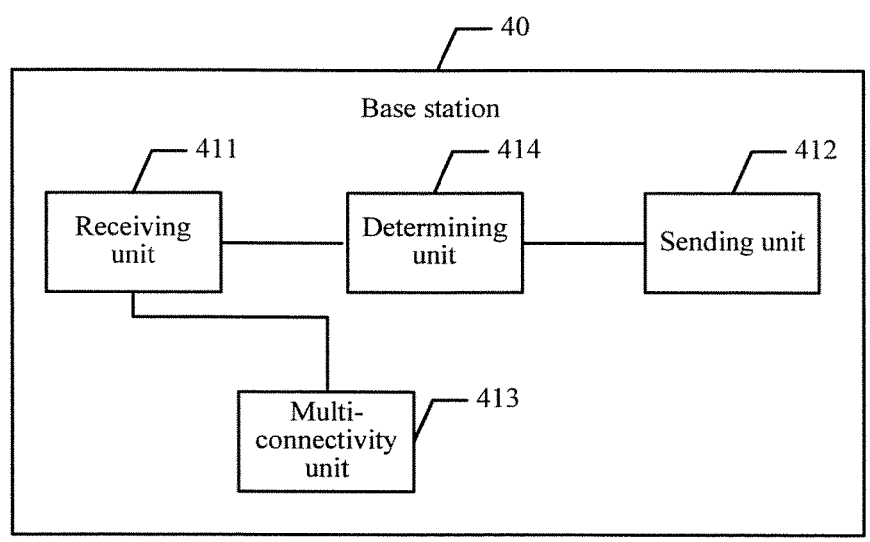
FIG. 12 is a schematic diagram of another embodiment of a base station according to an embodiment of the present embodiment of the invention.

On the basis of the embodiment corresponding to FIG. 11 above, referring to FIG. 12, in another embodiment of the base station according to this embodiment of the present embodiment of the invention, the base station further includes:

a determining unit 414, configured to determine, according to configured indication information used for controlling handover of the user equipment, the base station of the at least one cell or the at least one base station that can provide, together with the current base station, a multi-connectivity service to the user equipment.

On the basis of the embodiment corresponding to FIG. 12 above, in another embodiment of the base station according to this embodiment of the present embodiment of the invention, the sending unit 412 is further configured to send adjacent cell information of a serving cell of the current base station to the serving base station, where the adjacent cell information includes the indication information used for controlling handover of the user equipment.

On the basis of the embodiment corresponding to FIG. 12 above, in another embodiment of the base station according to this embodiment of the present embodiment of the invention, the receiving unit 411 is further configured to receive the indication information that is configured by an operations, administration, and maintenance entity OAM and that is used for controlling handover of the user equipment.

Figure 13:
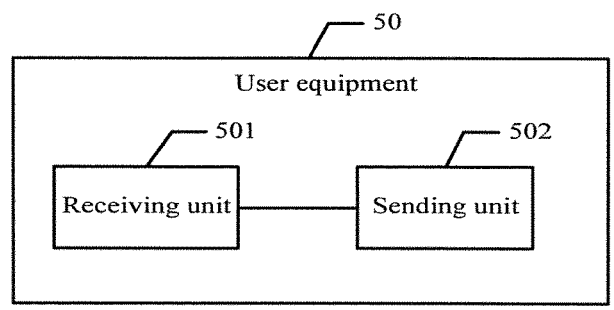
FIG. 13 is a schematic diagram of an embodiment of user equipment according to an embodiment of the present embodiment of the invention.

Referring to FIG. 13, an embodiment of user equipment according to this embodiment of the present embodiment of the invention includes:

a receiving unit 501, configured to receive indication information, used for controlling handover of the user equipment, broadcast by at least one base station providing a multi-connectivity service, where the indication information is used for indicating a cell or base station that can provide a multi-connectivity service to the user equipment; and a sending unit 502, configured to send a measurement report to a serving base station, where the measurement report carries the indication information used for controlling handover of the user equipment, so that the serving base station determines, according to the indication information, from the cell or base station that can provide a multi-connectivity service to the user equipment, a target cell or a target base station for handover, and further, a base station of the target cell or the target base station provides a connectivity service to the user equipment.

Figure 14:
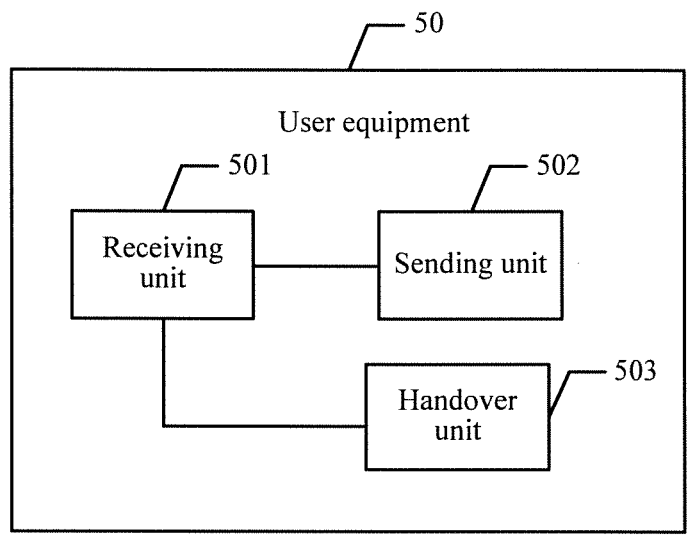
FIG. 14 is a schematic diagram of another embodiment of user equipment according to an embodiment of the present embodiment of the invention.

On the basis of the embodiment corresponding to FIG. 13 above, referring to FIG. 14, the user equipment according to this embodiment of the present embodiment of the invention further includes:

the receiving unit 501, further configured to receive a handover response sent by the serving base station; and a handover unit 503, configured to: after the receiving unit 501 receives the handover response sent by the serving base station, perform handover from the serving base station to the target base station.

An embodiment of the present embodiment of the invention further provides a computer readable storage medium, where the medium stores a program, and when the program is executed, some or all steps in the foregoing method, executed on a side of a serving base station, for controlling handover of user equipment are included.

An embodiment of the present embodiment of the invention further provides a computer readable storage medium, where the medium stores a program, and when the program is executed, some or all steps in the foregoing method, executed on a side of user equipment, for controlling handover of user equipment are included.

An embodiment of the present embodiment of the invention further provides a computer readable storage medium, where the medium stores a program, and when the program is executed, some or all steps in the foregoing method, executed on a side of user equipment, for controlling handover of user equipment are included.

Figure 15:
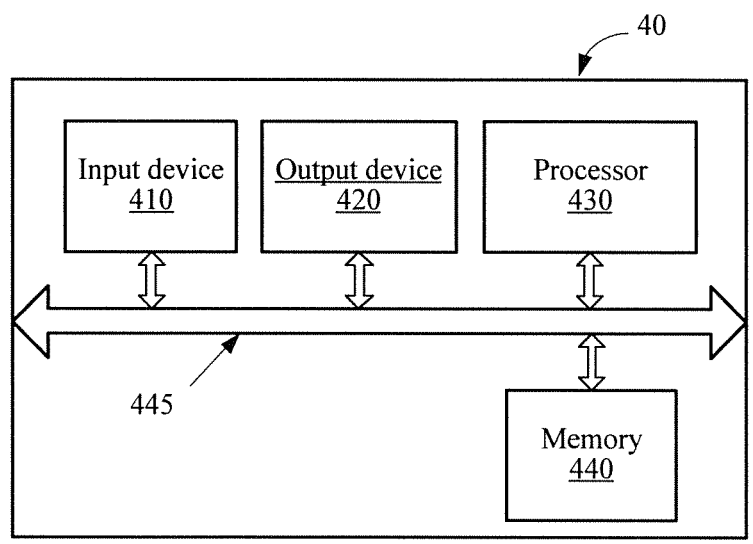
FIG. 15 is a schematic diagram of another embodiment of a base station according to an embodiment of the present embodiment of the invention.

FIG. 15 is a schematic structural diagram of a base station 40 according to an embodiment of the present embodiment of the invention. The base station 40 may include an input device 410, an output device 420, a processor 430, and a memory 440.

The memory 440 may include a read-only memory and a random access memory, and provide an instruction and data to the processor 430. A part of the memory 440 may further include a non-volatile random access memory (NVRAM).

The memory 440 stores the following element, executable module, or data structure, or a subset or an extended set thereof:

an operation instruction: including various operation instructions, used for implementing various operations; and an operating system: including various system programs, used for implementing various basis services and processing hardware-based tasks.

In this embodiment of the present embodiment of the invention, the processor 430 executes, by invoking the operation instruction stored in the memory 440 (where the operation instruction may be stored in the operating system), the following operations:

acquiring, by using the input device 410, indication information used for controlling handover of user equipment, where the indication information is used for indicating a cell or base station that can provide a multi-connectivity service to the user equipment; determining, according to the indication information, from the cell or base station that can provide a multi-connectivity service to the user equipment, a target cell or a target base station for handover; and sending, by using the output device 420, a handover request to a base station of the target cell or the target base station, so that the base station of the target cell or the target base station provides a connectivity service to the user equipment.

In this embodiment of the present embodiment of the invention, user equipment can be accurately handed over to another base station that can provide a multi-connectivity service to the user equipment.

The processor 430 controls an operation of the base station 40, and the processor 430 may be further referred to as a Central Processing Unit (CPU). The memory 440 may include a read-only memory and a random access memory, and provide an instruction and data to the processor 430. A part of the memory 440 may further include a non-volatile random access memory (NVRAM). In specific application, components of the base station 40 are coupled together by using a bus system 445, where besides including a data bus, the bus system 445 may further include a power bus, a control bus, a status signal bus, and the like. However, for clear description, various buses are all marked as the bus system 445 in the figure.

The foregoing methods disclosed in the embodiments of the present embodiment of the invention may be applied in the processor 430, or may be implemented by using the processor 430. The processor 430 may be an integrated circuit chip and has a signal processing capability. In an implementation process, the steps of the methods may be carried out by using an integrated logical circuit of hardware in the processor 430 or an instruction in a form of software. The foregoing processor 430 may be a general purpose processor, a digital signal processor (DSP), an application-specific integrated circuit (ASIC), a field programmable gate array (FPGA) or another programmable logic device, a discrete gate or a transistor logic device, or a discrete hardware component, and may implement or execute the methods, steps, and logic block diagrams disclosed in the embodiments of the present embodiment of the invention. The general purpose processor may be a micro processor or the processor may also be any conventional processor or the like. In combination with the methods disclosed in the embodiment of the present embodiment of the invention, the steps may be directly embodied as being implemented by a hardware decoding processor, or may be executed and carried out by using a combination of hardware and software modules in a decoding processor. The software module may be located in a mature storage medium in the field, such as a random memory, a flash memory, a read-only memory, a programmable read-only memory, an electrically erasable programmable memory, or a register. The storage medium is located in the memory 440, and the processor 430 reads information in the memory 440 to carry out the steps of the methods in combination with the hardware of the processor 430.

Optionally, the input device 410 acquires adjacent cell information of a serving cell of a base station of a cell providing a multi-connectivity service or adjacent cell information of a serving cell of a base station providing a multi-connectivity service, where the adjacent cell information includes the indication information; and reads the indication information from the adjacent cell information.

Optionally, the input device 410 receives the indication information configured by an operations, administration, and maintenance entity OAM.

Optionally, the input device 410 receives the indication information reported by the user equipment.

Optionally, when the indication information is an inter-cell multi-connectivity indication identifier, the processor 430 may further determine, according to the inter-cell multi-connectivity indication identifier, from the cell that can provide a multi-connectivity service to the user equipment, the target cell for handover; and the output device 420 may further send the handover request to the base station of the target cell, so that the base station of the target cell provides a connectivity service to the user equipment.

Optionally, when the indication information is an inter-base station multi-connectivity indication identifier, the processor 430 may further determine, according to the inter-base station multi-connectivity indication identifier, from the base station that can provide a multi-connectivity service to the user equipment, the target base station for handover; and the output device 420 may further send the handover request to the target base station, so that the target base station provides a connectivity service to the user equipment.

Optionally, when the indication information is multiple cell identifiers ECGIs, the processor 430 may further search the multiple ECGIs for at least one ECGI whose base station identifier field is different from a base station identifier field of a serving base station; and determine the target base station from a base station corresponding to the at least one ECGI; and the output device 420 may further send the handover request to the target base station, where the handover request carries an ECGI whose base station identifier field is the target base station, so that the target base station provides a connectivity service to the user equipment.

Figure 16:
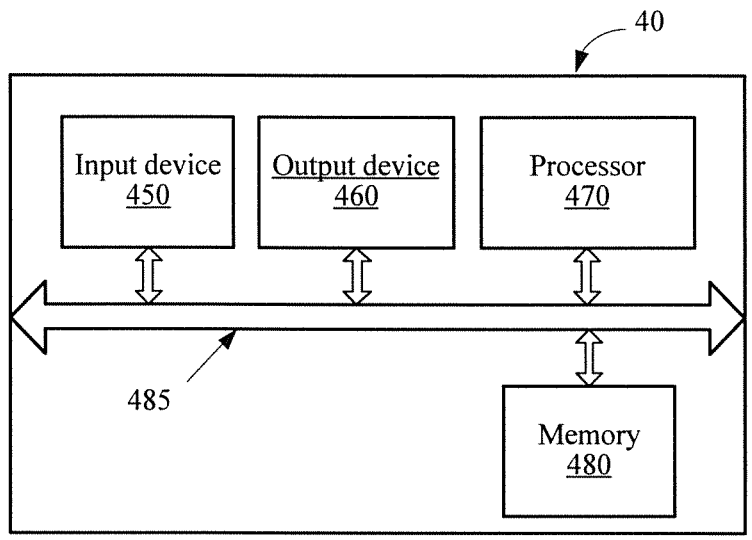
FIG. 16 is a schematic diagram of another embodiment of a base station according to an embodiment of the present embodiment of the invention.

FIG. 16 is a schematic structural diagram of a base station 40 according to an embodiment of the present embodiment of the invention. The base station 40 may include an input device 450, an output device 460, a processor 470, and a memory 480.

The memory 480 may include a read-only memory and a random access memory, and provide an instruction and data to the processor 470. Apart of the memory 480 may further include a non-volatile random access memory (NVRAM).

The memory 480 stores the following element, executable module, or data structure, or a subset or an extended set thereof:

an operation instruction: including various operation instructions, used for implementing various operations; and an operating system: including various system programs, used for implementing various basis services and processing hardware-based tasks.

In this embodiment of the present embodiment of the invention, the processor 470 executes, by invoking the operation instruction stored in the memory 480 (where the operation instruction may be stored in the operating system), the following operations:

receiving, by using the input device 450, a handover request sent by a serving base station; sending, by using the output device 460 to a base station of at least one configured cell or at least one configured base station that can provide, together with the current base station, a multi-connectivity service to user equipment, a request for providing a multi-connectivity service to the user equipment; and after the input device 450 receives an acknowledgment sent by the base station of the at least one cell or the at least one base station, providing, together with the base station of the at least one cell or the at least one base station, a multi-connectivity service to the user equipment.

The processor 470 controls an operation of the base station 40, and the processor 470 may be further referred to as a Central Processing Unit (CPU). The memory 480 may include a read-only memory and a random access memory, and provide an instruction and data to the processor 470. A part of the memory 480 may further include a non-volatile random access memory (NVRAM). In specific application, components of the base station 40 are coupled together by using a bus system 485, where besides including a data bus, the bus system 485 may further include a power bus, a control bus, a status signal bus, and the like. However, for clear description, various buses are all marked as the bus system 485 in the figure.

The foregoing methods disclosed in the embodiments of the present embodiment of the invention may be applied in the processor 470, or may be implemented by using the processor 470. The processor 470 may be an integrated circuit chip and has a signal processing capability. In an implementation process, the steps of the methods may be carried out by using an integrated logical circuit of hardware in the processor 470 or an instruction in a form of software. The foregoing processor 470 may be a general purpose processor, a digital signal processor (DSP), an application-specific integrated circuit (ASIC), a field programmable gate array (FPGA) or another programmable logic device, a discrete gate or a transistor logic device, or a discrete hardware component, and may implement or execute the methods, steps, and logic block diagrams disclosed in the embodiments of the present embodiment of the invention. The general purpose processor may be a microprocessor or the processor may also be any conventional processor or the like. In combination with the methods disclosed in the embodiment of the present embodiment of the invention, the steps may be directly embodied as being implemented by a hardware decoding processor, or may be executed and carried out by using a combination of hardware and software modules in a decoding processor. The software module may be located in a mature storage medium in the field, such as a random memory, a flash memory, a read-only memory, a programmable read-only memory, an electrically erasable programmable memory, or a register. The storage medium is located in the memory 480, and the processor 470 reads information in the memory 480 to carry out the steps of the methods in combination with the hardware of the processor 470.

Optionally, the processor 470 may further determine, according to configured indication information used for controlling handover of the user equipment, the base station of the at least one cell or the at least one base station that can provide, together with the current base station, a multi-connectivity service to the user equipment.

Optionally, the output device 460 may further send adjacent cell information of a serving cell of the current base station to the serving base station, where the adjacent cell information includes the indication information used for controlling handover of user equipment.

Optionally, the input device 450 may further receive the indication information that is configured by an operations, administration, and maintenance entity OAM and that is used for controlling handover of the user equipment.

Figure 17:
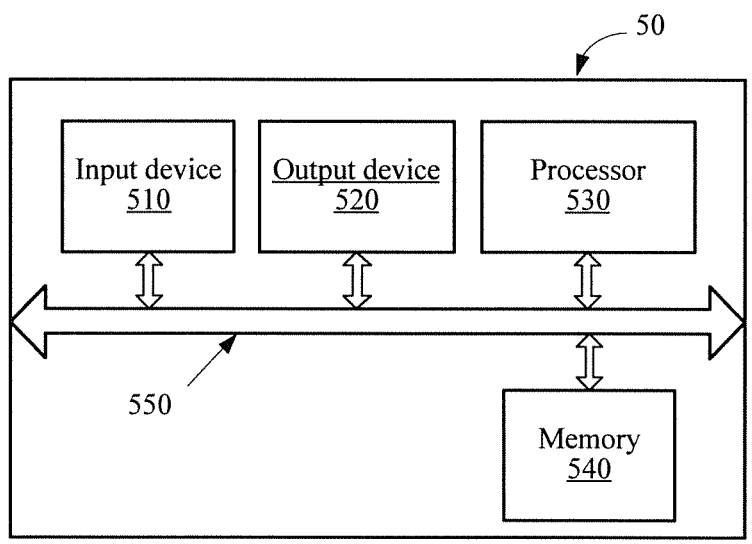
FIG. 17 is a schematic diagram of another embodiment of user equipment according to an embodiment of the present embodiment of the invention.

FIG. 17 is a schematic structural diagram of user equipment 50 according to an embodiment of the present embodiment of the invention. The user equipment 50 may include an input device 510, an output device 520, a processor 530, and a memory 540.

The memory 540 may include a read-only memory and a random access memory, and provide an instruction and data to the processor 530. A part of the memory 540 may further include a non-volatile random access memory (NVRAM).

The memory 540 stores the following element, executable module or data structure, or a subset or an extended set thereof:

an operation instruction: including various operation instructions, used for implementing various operations; and an operating system: including various system programs, used for implementing various basis services and processing hardware-based tasks.

In this embodiment of the present embodiment of the invention, the processor 530 executes, by invoking the operation instruction stored in the memory 540 (where the operation instruction may be stored in the operating system), the following operations:

receiving, by using the input device 510, indication information, used for controlling handover of user equipment, broadcast by at least one base station providing a multi-connectivity service, where the indication information is used for indicating a cell or base station that can provide a multi-connectivity service to the user equipment; and sending, by using the output device 520, a measurement report to a serving base station, where the measurement report carries the indication information used for controlling handover of the user equipment, so that the serving base station determines, according to the indication information, from the cell or base station that can provide a multi-connectivity service to the user equipment, a target cell or a target base station for handover, and further, a base station of the target cell or the target base station provides a connectivity service to the user equipment.

The processor 530 controls an operation of the user equipment 50, and the processor 530 may be further referred to as a Central Processing Unit (CPU). The memory 540 may include a read-only memory and a random access memory, and provide an instruction and data to the processor 530. A part of the memory 540 may further include a non-volatile random access memory (NVRAM). In specific application, components of the user equipment 50 are coupled together by using a bus system 550, where besides including a data bus, the bus system 550 may further include a power bus, a control bus, a status signal bus, and the like. However, for clear description, various buses are all marked as the bus system 550 in the figure.

The foregoing methods disclosed in the embodiments of the present embodiment of the invention may be applied in the processor 530, or may be implemented by using the processor 530. The processor 530 may be an integrated circuit chip and has a signal processing capability. In an implementation process, the steps of the methods may be carried out by using an integrated logical circuit of hardware in the processor 530 or an instruction in a form of software. The foregoing processor 530 may be a general purpose processor, a digital signal processor (DSP), an application-specific integrated circuit (ASIC), a field programmable gate array (FPGA) or another programmable logic device, a discrete gate or a transistor logic device, or a discrete hardware component. The methods, steps, and logic block diagrams disclosed in the embodiments of the present embodiment of the invention may be implemented or executed. The general purpose processor may be a microprocessor or the processor may also be any conventional processor or the like. In combination with the methods disclosed in the embodiment of the present embodiment of the invention, the steps may be directly embodied as being implemented by a hardware decoding processor, or may be executed and carried out by using a combination of hardware and software modules in a decoding processor. The software module may be located in a mature storage medium in the field, such as a random memory, a flash memory, a read-only memory, a programmable read-only memory, an electrically erasable programmable memory, or a register. The storage medium is located in the memory 540, and the processor 530 reads information in the memory 540 to carry out the steps of the methods in combination with the hardware of the processor 530.

Optionally, the input device 510 may further receive a handover response sent by the serving base station; and the processor 530 may further perform handover from the serving base station to the target base station.

Figure 18:
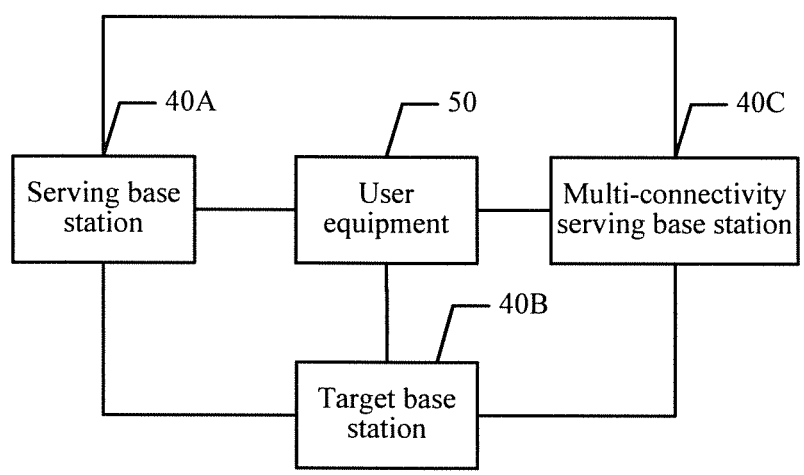
FIG. 18 is a schematic diagram of an embodiment of a communications system according to an embodiment of the present embodiment of the invention.

Referring to FIG. 18, an embodiment of a communications system according to an embodiment of the present embodiment of the invention includes: user equipment 50, a serving base station 40A, a target base station 40B, and at least one base station 40C that provides, together with the target base station or the serving base station, a multi-connectivity service to the user equipment.

The serving base station 40A is configured to acquire indication information used for controlling handover of user equipment, where the indication information is used for indicating a cell or base station that can provide a multi-connectivity service to the user equipment; determine, according to the indication information, from the cell or base station that can provide a multi-connectivity service to the user equipment, a target cell or a target base station for handover; and send a handover request to a base station of the target cell or the target base station, so that the base station of the target cell or the target base station provides a connectivity service to the user equipment.

The target base station 40B is configured to receive a handover request sent by the serving base station; send, to a base station of at least one configured cell or at least one configured base station that can provide, together with the current base station, a multi-connectivity service to the user equipment, a request for providing a multi-connectivity service to the user equipment; and after an acknowledgment sent by the base station of the at least one cell or the at least one base station is received, provide, together with the base station of the at least one cell or the at least one base station, a multi-connectivity service to the user equipment.

The user equipment 50 is configured to receive indication information, used for controlling handover of the user equipment, broadcast by at least one base station providing a multi-connectivity service, where the indication information is used for indicating a cell or base station that can provide a multi-connectivity service to the user equipment; and send a measurement report to the serving base station, where the measurement report carries the indication information used for controlling handover of the user equipment, so that the serving base station determines, according to the indication information, from the cell or base station that can provide a multi-connectivity service to the user equipment, a target cell or a target base station for handover, and further, a base station of the target cell or the target base station provides a connectivity service to the user equipment.

The communications system according to this embodiment of the present embodiment of the invention can accurately hand over user equipment to another base station that can provide a multi-connectivity service to the user equipment.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The method for controlling handover of user equipment, the base station, the user equipment, and the system provided in the embodiments of the present embodiment of the invention are introduced above in detail. In this specification, specific examples are used to describe the principle and implementation manners of the present embodiment of the invention, and the description of the embodiments is only intended to help understand the method and core idea of the present embodiment of the invention. Meanwhile, a person of ordinary skill in the art may, based on the idea of the present embodiment of the invention, make modifications with respect to the specific implementation manners and the application scope. Therefore, the content of this specification shall not be construed as a limitation to the present embodiment of the invention.

What is claimed is:

1. A method for controlling handover of user equipment, the method comprising:
   receiving a measurement report sent by the user equipment, the measurement report carrying an inter-base station multi-connectivity indication identifier indicating one or more base stations that can provide a multi-connectivity service to the user equipment, wherein the inter-base station multi-connectivity indication identifier is received by the user equipment in a message broadcast by a first base station before the user equipment sends the measurement report;
   determining from the one or more base stations that can provide a multi-connectivity service to the user equipment, a target base station for handover; and
   sending a handover request to the target base station.

2. The method according to claim 1, wherein when the inter-base station multi-connectivity indication identifier comprises multiple E-UTRAN Cell Global Identifiers (ECGIs):
   determining from the one or more base stations that can provide a multi-connectivity service to the user equipment, a target base station for handover comprises:
      searching the multiple ECGIs for at least one ECGI whose base station identifier field is different from a base station identifier field of a serving base station, and
      determining the target base station from a base station corresponding to the at least one ECGI; and
   sending a handover request to the target base station comprises:
      sending the handover request to the target base station, wherein the handover request carries an ECGI whose base station identifier field is the target base station.

3. A base station, comprising:
   a receiver, configured to receive a measurement report sent by a user equipment, the measurement report carrying an inter-base station multi-connectivity indication identifier indicating one or more base stations that can provide a multi-connectivity service to the user equipment, wherein the inter-base station multi-connectivity indication identifier is received by the user equipment in a message broadcast by a first base station before the user equipment sends the measurement report;

a processor configured to determine from the one or more base stations that can provide a multi-connectivity service to the user equipment, a target base station for handover; and a transmitter configured to send a handover request to the target base station determined by the processor.

4. The base station according to claim 3, wherein when the inter-base station multi-connectivity indication identifier comprises multiple E-UTRAN Cell Global Identifiers (ECGIs):

the processor is configured to search the multiple ECGIs for at least one ECGI whose base station identifier field is different from a base station identifier field of a serving base station; and the transmitter is configured to send the handover request to the target base station, wherein the handover request carries an ECGI whose base station identifier field is the target base station.

5. User equipment, comprising:

a processor;

a memory;

an input device configured to receive an inter-base station multi-connectivity indication identifier broadcast by at least one base station providing a multi-connectivity service, the inter-base station multi-connectivity indication identifier indicating one or more base stations that can provide a multi-connectivity service to the user equipment; and an output device configured to send a measurement report to a serving base station, wherein the measurement report carries the inter-base station multi-connectivity indication identifier, wherein the input device is further configured to, in response to sending the measurement report, receive a handover request from the serving base station, for handing over to a target base station from among the one or more base stations to provide a connectivity service to the user equipment.

* * * * *